US008533560B2

(12) United States Patent
Fukutomi et al.

(10) Patent No.: US 8,533,560 B2
(45) Date of Patent: Sep. 10, 2013

(54) CONTROLLER, DATA STORAGE DEVICE AND PROGRAM PRODUCT

(75) Inventors: Kazuhiro Fukutomi, Kanagawa (JP); Shinichi Kanno, Tokyo (JP); Shigehiro Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 195 days.

(21) Appl. No.: 13/218,812

(22) Filed: Aug. 26, 2011

(65) Prior Publication Data

US 2012/0226957 A1 Sep. 6, 2012

(30) Foreign Application Priority Data

Mar. 1, 2011 (JP) ................................ 2011-044425

(51) Int. Cl.
*H03M 13/00* (2006.01)
(52) U.S. Cl.
USPC .......................................................... 714/758
(58) Field of Classification Search
USPC .......................................................... 714/758
See application file for complete search history.

(56) References Cited

U.S. PATENT DOCUMENTS

| 7,900,117 | B2 | 3/2011 | Kanno |
| 2009/0183052 | A1 | 7/2009 | Kanno et al. |
| 2010/0223531 | A1 | 9/2010 | Fukutomi et al. |
| 2011/0060863 | A1 | 3/2011 | Kimura et al. |
| 2011/0202812 | A1 | 8/2011 | Asano et al. |
| 2011/0302474 | A1 * | 12/2011 | Goss et al. ..................... 714/758 |

FOREIGN PATENT DOCUMENTS

| JP | 60-116030 A | 6/1985 |
| JP | 1-156834 A | 6/1989 |
| JP | 5-2830 | 1/1993 |
| JP | 2003-6981 A | 1/2003 |

OTHER PUBLICATIONS

U.S. Appl. No. 13/217,461, Aug. 25, 2011, Shigehiro Asano, et al.
U.S. Appl. No. 13/035,194, Feb. 25, 2011, Kazuhiro Fukutomi, et al.
U.S. Appl. No. 13/038,804, Mar. 2, 2011, Kazumasa Yamamoto, et al.
U.S. Appl. No. 12/889,018, Sep. 23, 2010, Shinichi Kanno.
Japanese Office Action Issued Jan. 22, 2013 in Patent Application No. 2011-044425 (with English translation).
U.S. Appl. No. 13/218,743, Aug. 26, 2011, Kanno, et al.

* cited by examiner

*Primary Examiner* — Guy Lamarre
(74) *Attorney, Agent, or Firm* — Oblon, Spivak, McClelland, Maier & Neustadt, L.L.P.

(57) ABSTRACT

According to an embodiment of a controller, a bit string manipulating unit manipulates a bit string of manipulation target data based on a predetermined rule. A special data setting unit generates a magic number based on a special data setting request from a host interface, obtains an error detecting code for the magic number, and sends the magic number and the error detecting code as manipulation target data to the bit string manipulating unit to obtain a manipulated manipulation target data. The special data setting unit also extracts logical block address information from the special data setting request, and instructs an access unit to write the magic number in the manipulated manipulation target data to a user data storage area and to write the error detecting code in the manipulated manipulation target data to a redundant area in a storage area located by the logical block address information.

14 Claims, 8 Drawing Sheets

CONTROLLER, DATA STORAGE DEVICE AND PROGRAM PRODUCT

CROSS-REFERENCE TO RELATED APPLICATION

This application is based upon and claims the benefit of priority from Japanese Patent Application No. 2011-044425, filed on Mar. 1, 2011; the entire contents of which are incorporated herein by reference.

FIELD

Embodiments described herein relate generally to a controller, a data storage device and a program product.

BACKGROUND

A data storage device is typically required to be set so as to perform, instead of a normal response sending user data, a predetermined response in response to a readout request for a certain logical block address (LBA) from a host device. In general, a data storage device is designed to perform a normal response in response to a readout request for a certain logical block address unless it is set to perform a predetermined response. However, with the configuration in which the setting for a logical block address is always checked before performing a normal response, it takes a long response time for the normal response. Here, it may be considered to perform reading out of user data from a recording medium and checking of the setting for a logical block address in parallel. In this case, however, it is still necessary to wait for the check result of the setting for the logical block address before sending the user data to the host device. Therefore, the response time for the normal response may be depended on the time for checking the setting for the logical block address and may become longer.

DETAILED DESCRIPTION

In general, according to one embodiment, a controller includes a bit string manipulating unit and a special data setting unit. The bit string manipulating unit manipulates a bit string of manipulation target data based on a predetermined rule. The special data setting unit generates a magic number based on a special data setting request from a host interface, obtains an error detecting code for the magic number, and sends the magic number and the error detecting code as manipulation target data to the bit string manipulating unit to obtain a manipulated manipulation target data. The special data setting unit also extracts logical block address information from the special data setting request, and instructs an access unit to write the magic number in the manipulated manipulation target data to a user data storage area and to write the error detecting code in the manipulated manipulation target data to a redundant area in a storage area located by the logical block address information.

A controller, a data storage device and a program according to exemplary embodiments will be described below in detail with reference to the drawings.

First Embodiment

Configuration

Figure 1:
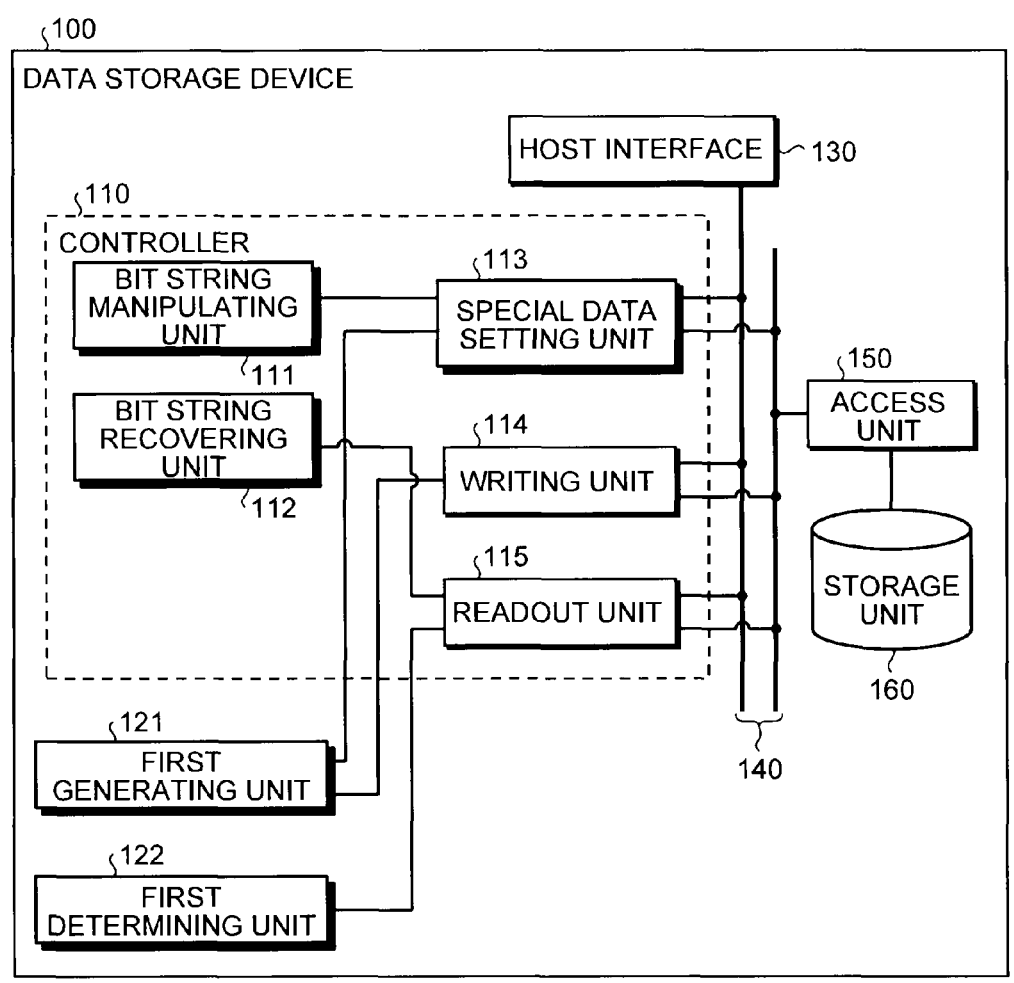
FIG. 1 is a diagram showing a schematic configuration of a data storage device according to a first embodiment.

In a first embodiment, a controller, a data storage device and a program will be exemplified. FIG. 1 illustrates a schematic configuration of a data storage device 100 according to the first embodiment. As illustrated in FIG. 1, the data storage device 100 includes a controller 110, a first generating unit 121, a first determining unit 122, a host interface 130, an access unit 150, and a storage unit 160. The controller 110 includes a bit string manipulating unit 111, a bit string recovering unit 112, a special data setting unit 113, a writing unit 114 and a readout unit 115. The controller 110 is interconnected with the access unit 150 and the host interface 130 via a data bus 140, for example. In the following description, special data refer to data for performing a predetermined response including a transmission of a predetermined acknowledge to a host device.

The storage unit 160 has a plurality of storage areas. Data associated with each logical block address of the data storage device 100 are stored in each of the storage areas. Note that, in the first embodiment, the logical block addresses of the data storage device 100 may be associated with physical addresses (physical block addresses) of the storage areas in the storage unit 160 in any form. For example, the logical block addresses and the physical block addresses may be statically fixed, or the associations between the logical block addresses and the physical block addresses may be managed by an address translation table. The address translation table can be dynamically modified at predetermined timings.

Figure 2:
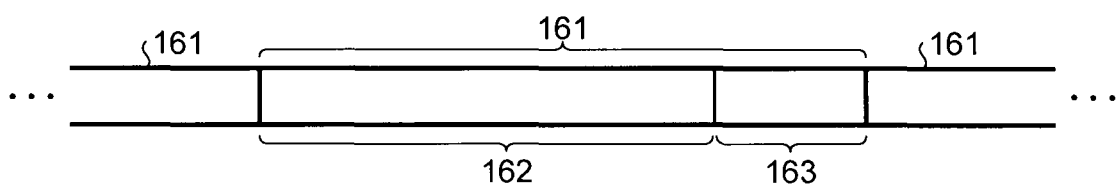
FIG. 2 illustrates an example of a storage area according to the first embodiment.

FIG. 2 illustrates an example of a storage area in the storage unit 160. As illustrated in FIG. 2, each storage area 161 includes a user data storage area 162 in which user data are stored and a redundant area 163 in which redundant data are stored. The redundant data may be an error detecting code or an error correcting code, for example.

The access unit 150 supports a writing process and a readout process to/from the storage unit 160 performed by the controller 110. The host interface 130 performs an interface process between the data storage device 100 and the host device (not illustrated).

More specifically, the host interface 130 receives a setting request for a logical block address from the host device. The setting request requests to set a predetermined response instead of a normal response with user data when a readout request for a logical block address of the data storage device 100 is issued by the host device. Herein, the setting request is referred to as a special data setting request. The special data setting request includes logical block address information and special data identification information for identifying the type of the predetermined response, for example. Upon receiving the special data setting request from the host device, the host interface 130 sends the received special data setting request to the special data setting unit 113.

The host interface 130 also receives a write request from the host device. The write request includes logical block address information of a storage area to write to and data to be written (hereinafter referred to as write target data), for example. Upon receiving the write request from the host device, the host interface 130 sends the received write request to the writing unit 114.

Furthermore, the host interface 130 receives a readout request from the host device. The readout request includes logical block address information of a storage area to read out from, for example. Upon receiving the readout request from the host device, the host interface 130 sends the received readout request to the readout unit 115. In addition, upon receiving a readout acknowledge from the readout unit 115 in response to the readout request, the host interface 130 sends the received readout acknowledge to the host device. The readout acknowledge includes readout target data requested by the host device or readout state information. The readout state information is information indicating a readout state. The information indicating a readout state may be information indicating a readout error, for example.

The first generating unit 121 receives data from which an error detecting code is generated from a request source of the error detecting code. The request source of the error detecting code may be the special data setting unit 113, the writing unit 114, or the like. The first generating unit 121 generates an error detecting code from the received data based on a predetermined method. The first generating unit 121 then sends the generated error detecting code to the request source. Note that the error detecting code may be replaced with an error correcting code herein.

The first determining unit 122 receives error detection target data and an error detecting code associated therewith from a request source of error determination. The request source of the error determination may be the readout unit 115, for example. The first determining unit 122 performs an error determination process of determining whether or not an error is present in the received error detection target data and error detecting code based on a predetermined method. The first determining unit 122 then sends the result of the error determination process to the request source. When the error detecting code is replaced with the error correcting code, the error determination process is replaced with "an error determination process of determining whether or not error correction of the received error correction target data and error correcting code is possible based on a predetermined method".

The bit string manipulating unit 111 receives manipulation target data from a request source of bit string manipulation. The manipulation target data include special data associated with a predetermined response and an error detecting code associated with the bit string of the special data, for example. The request source of the bit string manipulation may be the special data setting unit 113, for example. The bit string manipulating unit 111 performs a bit string manipulation process of manipulating the bit string of the received manipulation target data according to a predetermined rule. The predetermined rule can be a rule of bit string manipulation resulting in error detection, and also a rule of bit string manipulation that allows a bit string resulting from the bit string manipulation to be recovered to the original bit string. An example of the predetermined rule may be inverting a predetermined bit value (0 or 1). However, the predetermined rule is not limited thereto. The bit string manipulating unit 111 then sends the manipulation target data resulting from the bit string manipulation to the request source. When the error detecting code is replaced with the error correcting code, the predetermined rule can be a rule "making error correction of a bit string resulting from the bit string manipulation impossible and allowing the bit string resulting from the bit string manipulation to be recovered to the original bit string". An example of the predetermined rule may be inverting a predetermined bit value (0 or 1) for the number of bits in excess of the error correcting capability. However, the predetermined rule is not limited thereto.

The bit string recovering unit 112 receives recovery manipulation target data from a request source of the bit string recovery manipulation. The request source of the bit string recovery manipulation may be the readout unit 115, for example. The recovery manipulation target data are manipulation target data resulting from the bit string manipulation, for example. Specifically, the recovery manipulation target data include special data resulting from the bit string manipulation and the error detecting code. The bit string recovering unit 112 performs a bit string recovery manipulation process of applying recovery manipulation to the bit string of the recovery manipulation target data according to a predetermined rule. The bit string recovery manipulation refers to recovery of the bit string of recovery manipulation target data to an original state before the bit string manipulation if the bit string results from manipulation by the bit string manipulating unit 111. If the bit string manipulation process is as the aforementioned example (inverting a predetermined bit value), the bit string recovery manipulation process can be inverting the predetermined bit value once again. As a result, the bit string resulting from the bit string manipulation can be recovered to the original bit string. Note that the bit string recovery manipulation process can be modified in various manners depending on the bit string manipulation process performed by the bit string manipulating unit 111. The bit string recovering unit 112 then sends the recovery manipulation target data resulting from the bit string recovery manipulation to the request source. When the error detecting code is replaced with the error correcting code, the predetermined bit value is inverted once again for the number of bits in excess of the error correcting capability in the bit string recovery manipulation process corresponding to the example of inverting the predetermined bit value for the number of bits in excess of the error correcting capability in the bit string manipulation process. As a result, the bit string resulting from the bit string manipulation can be recovered to the original bit string.

Specific examples of a series of processes from the bit string manipulation to the bit string recovery manipulation will be described in detail referring to FIGS. 3A to 4C. As described above, the processes of the bit string manipulation and the bit string recovery manipulation are not limited to the specific examples described below.

Figure 3A:
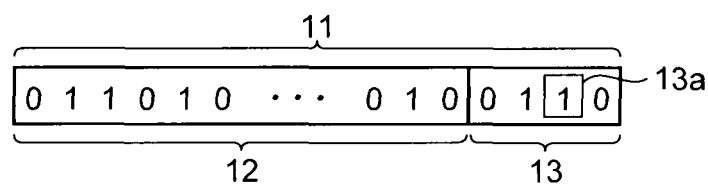
FIG. 3A illustrates an example of manipulation target data containing an error detecting code according to the first embodiment.

First, a specific example of a series of processes from the bit string manipulation to the bit string recovery manipulation using an error detecting code will be described referring to FIGS. 3A to 3C. FIG. 3A illustrates an example of manipulation target data. As illustrated in FIG. 3A, manipulation target data 11 include special data 12 having a bit length equal to the length of the user data storage area 162 of the storage area 161 in the storage unit 160 and an error detecting code 13 that is composed of several lower bits, for example. The error detecting code 13 is a value generated from the special data 12 based on a predetermined method.

In the bit string manipulation process, upon receiving the manipulation target data 11 (FIG. 3A) from the request source, the bit string manipulating unit 111 inverts the value of a predetermined bit (second lowest bit 13a, for example) thereof. As a result, recovery manipulation target data 11A in which a correct error detecting code 13 has been changed to an error detecting code 13A including an error are obtained as illustrated in FIG. 3B. The number of bits to be manipulated may be more than one. Moreover, data to be input to the bit string manipulating unit 111 may be at least one of the special data 12 and the error detecting code 13 in the manipulation target data 11. In other words, the bit string to be manipulated may be at least one of the special data 12 and the error detecting code 13, and only the bit string to be manipulated needs to be input to the bit string manipulating unit 111.

Figure 3B:
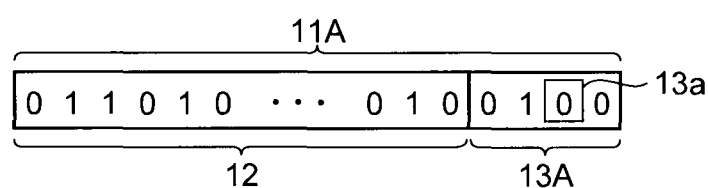
FIG. 3B illustrates an example of recovery manipulation target data resulting from bit string manipulation according to the first embodiment.
Figure 3C:
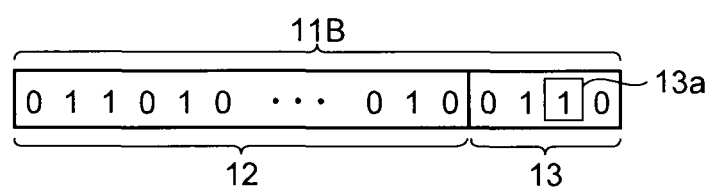
FIG. 3C illustrates an example of recovered data resulting from bit string recovery manipulation according to the first embodiment.

In the bit string recovery manipulation process, on the other hand, upon receiving the recovery manipulation target data 11A as illustrated in FIG. 3B, the bit string recovering unit 112 inverts the value of the predetermined bit 13a thereof again. As a result, recovered data 11B in which the value of the predetermined bit 13a has been recovered are obtained as illustrated in FIG. 3C. As is apparent by comparing FIGS. 3A and 3C, the bit string of the recovered data 11B (FIG. 3C) is the same as that of the manipulation target data 11 (FIG. 3A). Specifically, as a result of the bit string recovery manipulation process, the bit string of the recovery manipulation target data 11A is restored to the bit string of the manipulation target data 11 before the bit string manipulation. Note that the data to be input to the bit string recovering unit 112 only need to be a bit string of at least one of the special data 12 and the error detecting code 13 that is manipulation target.

While the bit string of the error detecting code 13 is manipulation target in this specific example, the manipulation target is not limited thereto. For example, the bit string of the special data 12 may be the manipulation target. Alternatively, both the bit string of the error detecting code 13 and the bit string of the special data 12 may be manipulation target. In other words, modifications can be made in any manner as long as an error is detected when the recovery manipulation target data 11A resulting from the bit string manipulation are input to the first determining unit 122, and no error is detected (i.e., data are correct) when the recovered data 11B resulting from the bit string recovery manipulation are input to the first determining unit 122.

Figure 4A:
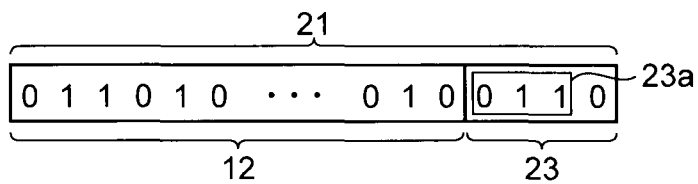
FIG. 4A illustrates an example of manipulation target data containing an error correcting code according to the first embodiment.

Next, a specific example of a series of processes from the bit string manipulation to the bit string recovery manipulation using an error correcting code will be described referring to FIGS. 4A to 4C. FIG. 4A illustrates an example of manipulation target data. As illustrated in FIG. 4A, manipulation target data 21 include special data 12 and an error correcting code 23 that is composed of several lower bits. The error correcting code 23 is a value generated from the special data 12 based on a predetermined method.

In the bit string manipulation process, upon receiving the manipulation target data 21 (FIG. 4A) from the request source, the bit string manipulating unit 111 inverts values of predetermined bits (second to fourth lowest bits 23a, for example) of the bit string thereof for the number of the predetermined bits in excess of the error correcting capability. As a result, recovery manipulation target data 21A in which a correct error correcting code 23 has been changed to an error correcting code 23A including an error in excess of the error correcting capability are obtained as illustrated in FIG. 4B. Note that data to be input to the bit string manipulating unit 111 may be at least one of the special data 12 and the error correcting code 23 in the manipulation target data 21. In other words, the bit string to be manipulated may be at least one of the special data 12 and the error correcting code 23, and only the bit string to be manipulated needs to be input to the bit string manipulating unit 111.

Figure 4B:
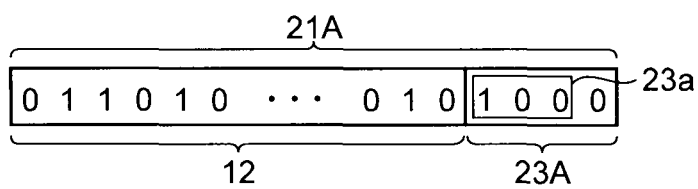
FIG. 4B illustrates an example of recovery manipulation target data resulting from bit string manipulation according to the first embodiment.
Figure 4C:
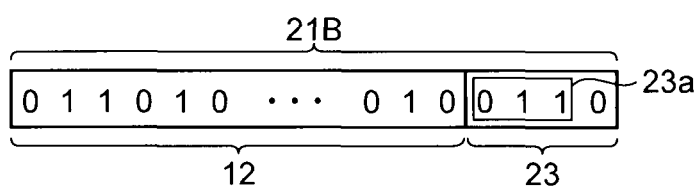
FIG. 4C illustrates an example of recovered data resulting from bit string recovery manipulation according to the first embodiment.

In the bit string recovery manipulation process, on the other hand, upon receiving the recovery manipulation target data 21A as illustrated in FIG. 4B, the bit string recovering unit 112 inverts the values of the predetermined bits 23a thereof again. As a result, recovered data 21B in which the values of the predetermined bits 23a have been recovered are obtained as illustrated in FIG. 4C. As is apparent by comparing FIGS. 4A and 4C, the bit string of the recovered data 21B (FIG. 4C) is the same as that of the manipulation target data 21 (FIG. 4A). Specifically, as a result of the bit string recovery manipulation process, the bit string of the recovery manipulation target data 21A is restored to the bit string of the manipulation target data 21 before the bit string manipulation. Note that data to be input to the bit string recovering unit 112 only need to be a bit string of at least one of the special data 12 and the error correcting code 23 that is manipulation target.

This specific example exemplifies a case in which the error correcting capability is two bits and the values of three bits in excess thereof are inverted. In this case, the bit string of the error correcting code 23 is also manipulation target as in the case of the error detecting code 13. However, the manipulation target is not limited thereto. For example, the bit string of the special data 12 may be the manipulation target. Alternatively, both the bit string of the error correcting code 23 and the bit string of the special data 12 may be manipulation target. In other words, modifications can be made in any manner as long as error correction is not possible when the manipulated data 21A resulting from the bit string manipulation are input to the first determining unit 122, and error correction is possible when the recovered data 21B resulting from the bit string recovery manipulation are input to the first determining unit 122.

The description refers back to FIG. 1. The writing unit 114 receives a write request from the host interface 130. The writing unit 114 extracts write target data from the received write request. The writing unit 114 then sends the extracted write target data to the first generating unit 121, and obtains an error detecting code associated with the write target data. The data to be sent to the first generating unit 121 may further include data other than the write target data. For example, the data to be sent to the first generating unit 121 may further include a bit string indicating logical block address information extracted from the received write request and a predetermined bit string.

The writing unit 114 extracts the logical block address information of a storage area to write to from the received write request. The writing unit 114 instructs the access unit 150 to write the write target data and the error detecting code to the storage area 161 in the storage unit 160 associated with the extracted logical block address information.

The special data setting unit 113 receives a special data setting request from the host interface 130. The special data setting unit 113 extracts special data identification information for identifying the type of the predetermined response from the special data setting request. The special data setting unit 113 also generates special data including an identification bit string that is a bit string corresponding to the extracted type of the predetermined response.

The identification bit string refers to a bit string associated uniquely with each of a plurality of types of response. The identification bit string is also called a magic number. The identification bit string allows a specific target (specific type of response) to be identified uniquely from a plurality of targets to be identified (a plurality of types of response).

Figure 5:
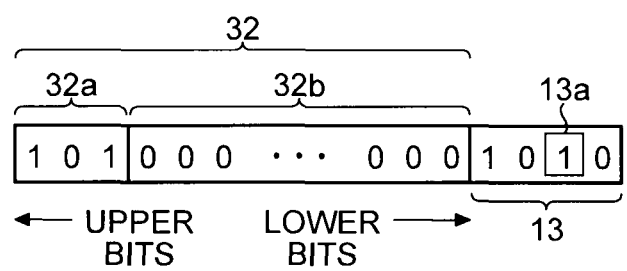
FIG. 5 illustrates an example of special data containing a magic number according to the first embodiment.

FIG. 5 illustrates an example of special data including a magic number. As illustrated in FIG. 5, special data 32 are composed of a bit string having the same size as the user data storage area 162 in the storage area 161 illustrated in FIG. 2. If the type of the predetermined response can be expressed by three bits, the upper three bits of the special data 32 are used for the magic number 32a, for example. The remaining bits of the special data 32 may be all "0" constituting NULL data 32b. Alternatively, the special data 32 may be modified in various manners as long as the special data 32 can be composed of values that can be managed or predicted by the controller 110.

The description refers back to FIG. 1. The special data setting unit 113 sends the generated special data 32 to the first generating unit 121 and obtains an error detecting code associated with the bit string of the special data 32. The data sent to the first generating unit 121 may further include data other than the special data 32. For example, the data may further include a bit string indicating logical block address information extracted from the received special data setting request and a predetermined bit string.

The special data setting unit 113 also sends the special data 32 and the error detecting code 13 to the bit string manipulating unit 111, and obtains the special data 32 and the error detecting code 13 resulting from bit string manipulation.

Furthermore, the special data setting unit 113 extracts the logical block address information from the received special data setting request. The special data setting unit 113 instructs the access unit 150 to write the special data and the error detecting code 13 resulting from the bit string manipulation to the storage area 161 in the storage unit 160 associated with the extracted logical block address information.

The readout unit 115 receives a readout request from the host interface 130. The readout unit 115 extracts logical block address information from the received readout request. The readout unit 115 instructs the access unit 150 to readout data stored in the storage area 161 in the storage unit 160 associated with the logical block address indicated by the extracted logical block address information and thus obtains the readout data.

The readout unit 115 then sends, to the first determining unit 122, data that were stored in the user data storage area 162 as error detection target data and data that were stored in the redundant area 163 as an error detecting code associated with the error detection target data out of the readout data. If data other than the write target data 11 or the special data 32 are further contained in the data to be sent by the writing unit 114 and the special data setting unit 113 to the first generating unit 121, the further contained data are also sent to the first determining unit 122. For example, if a bit string indicating logical block address information contained in a write request or a special data setting request is further contained, the bit string indicating the logical block address information extracted from the readout request is further sent to the first determining unit 122. For another example, if a predetermined bit string is further contained, the predetermined bit string is also sent to the first determining unit 122. The readout unit 115 then obtains a first determination result sent from the first determining unit 122.

If the first determination result obtained from the first determining unit 122 shows that no error is detected, the readout unit 115 sends, to the host interface 130, a readout acknowledge containing the data that were stored in the user data storage area 162 out of the data read out from the storage area 161. The readout acknowledge may be the entire readout data. When the error correcting code is used instead of the error detecting code, and if the obtained first determination result shows that an error correction process is possible, the readout unit 115 corrects the error of the readout data. The readout unit 115 also sends, to the host interface 130, a readout acknowledge containing the data that were stored in the user data storage area 162 out of the error corrected data. Specifically, in response to a readout request for a logical block address that is not associated with any special data 32 and for which no error is occurred in the bit string of data stored in the storage unit 160 or an error is occurred in the bit string of data stored in the storage unit 160 but the error is in a correctable range, the readout unit 115 can send a readout acknowledge to the host device through a normally required error detection process or error correction process.

However, as a result of an error occurred in the bit string (resulting from the bit string manipulation) of data stored in the storage unit 160 as the special data 32, there may be a case in which the bit string in which the error is occurred becomes identical to the bit string resulting from the bit string recovery manipulation performed by the bit string recovering unit 112 by accident, or a case in which the error in the bit string in which the error is occurred becomes in a correctable range. In such cases, a readout acknowledge similar to that in a case where the first determination result shows that no error is detected or a case where the first determination result shows that an error correction process is possible is performed even in response to the readout request for the logical block address for which the special data 32 are set. Thus, there is a possibility that a predetermined acknowledge is not returned to the host device according to the predetermined response corresponding to the special data 32. However, such cases occur as a result of an error occurred in data stored in the storage unit 160. The possibility that an incorrect response is returned to the host device when an error occurs in data stored in the storage unit 160 is a matter of trade-off with the cost required for a rigorous design. Therefore, the operation need not necessarily be regarded as erroneous operation. As a result, the normal readout process can be performed at a higher speed.

If, on the other hand, the first determination result obtained from the first determining unit 122 shows that an error is detected or that the error correction process is not possible, the readout unit 115 sends the data read out from the storage area 161, namely, the data that were stored in the user data storage area 162 and the data that were stored in the redundant area 163 to the bit string recovering unit 112, and obtains data resulting from the bit string recovery manipulation from the bit string recovering unit 112.

The readout unit 115 then sends, to the first determining unit 122, the data resulting from the bit string recovery manipulation that were stored in the user data storage area 162 as error detection target data and the data resulting from the bit string recovery manipulation that were stored in the redundant area 163 as an error detecting code associated with the error detection target data out of the data obtained from the bit string recovering unit 112. If data other than the write target data or the special data 32 are further contained in the data to be sent by the writing unit 114 and the special data setting unit 113 to the first generating unit 121, the further contained data are also sent to the first determining unit 122. For example, if a bit string indicating logical block address information contained in a write request or a special data setting request is further contained, the bit string indicating the logical block address information extracted from the readout request is further sent to the first determining unit 122. For another example, if a predetermined bit string is further contained, the predetermined bit string is also sent to the first determining unit 122. The readout unit 115 then obtains a second determination result sent from the first determining unit 122.

If the second determination result obtained from the first determining unit 122 shows that no error is detected, the readout unit 115 assumes predetermined bits of the special data 32 that were stored in the user data storage area 162 out of the data resulting from the bit string recovery manipulation to be the magic number 32a to identify the special data identification information. When the error correcting code is used instead of the error detecting code, and if the obtained second determination result shows that an error correction process is possible, the readout unit 115 corrects the error of the data resulting from the bit string recovery manipulation. The readout unit 115 then assumes predetermined bits of the data that were stored in the user data storage area 162 out of the error corrected data to be the magic number 32a to identify the special data identification information. The readout unit 115 further sends a predetermined acknowledge corresponding to the identified special data identification information to the host interface 130. Specifically, in response to a readout request for a logical block address associated with special data and for which no error is occurred in the bit string of data stored in the storage unit 160 or an error is occurred in the bit string of data stored in the storage unit 160 but the error is in a correctable range as a result of the bit string recovery manipulation, the readout unit 115 can send a predetermined acknowledge to the host device.

However, as a result of an error occurred in the bit string (that has not been subjected to the bit string manipulation) of data stored in the storage unit 160 as normal user data, there may be a case in which the bit string of the data in which the error is occurred becomes identical to the bit string resulting from the bit string manipulation performed by the bit string manipulating unit 111 by accident, or a case in which the bit string in which the error is occurred is subjected to the bit string recovery manipulation performed by the bit string recovering unit 112 and the error in the bit string resulting from the bit string recovery manipulation becomes in a correctable range. In such cases, a predetermined response is performed even in response to the readout request for the logical block address associated with the normal user data similarly to a case where the second determination result shows that no error is detected or that an error correction process is possible. Thus, there is a possibility that a readout acknowledge which is the normal user data is not returned to the host device. However, such cases occur as a result of an error occurred in data stored in the storage unit 160. As described above, the possibility that an incorrect response is returned to the host device when an error occurs in data stored in the storage unit 160 is a matter of trade-off with the cost required for a rigorous design. Therefore, the operation need not necessarily be regarded as erroneous operation.

If, on the other hand, the second determination result obtained from the first determining unit 122 shows that an error is detected or that the error correction process is not possible, the readout unit 115 sends readout state information indicating a readout error as the readout acknowledge to the host interface 130.

Operations

Figure 6:
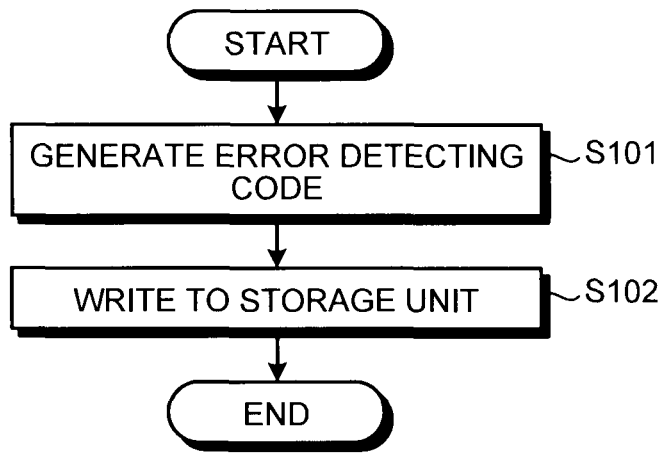
FIG. 6 illustrates an example of a writing process according to the first embodiment.
Figure 7:
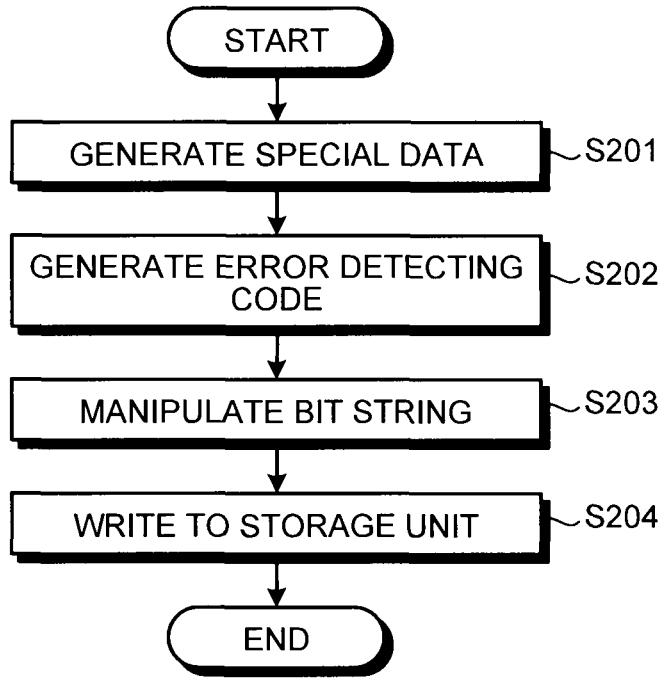
FIG. 7 illustrates an example of a special data setting process according to the first embodiment.
Figure 8:
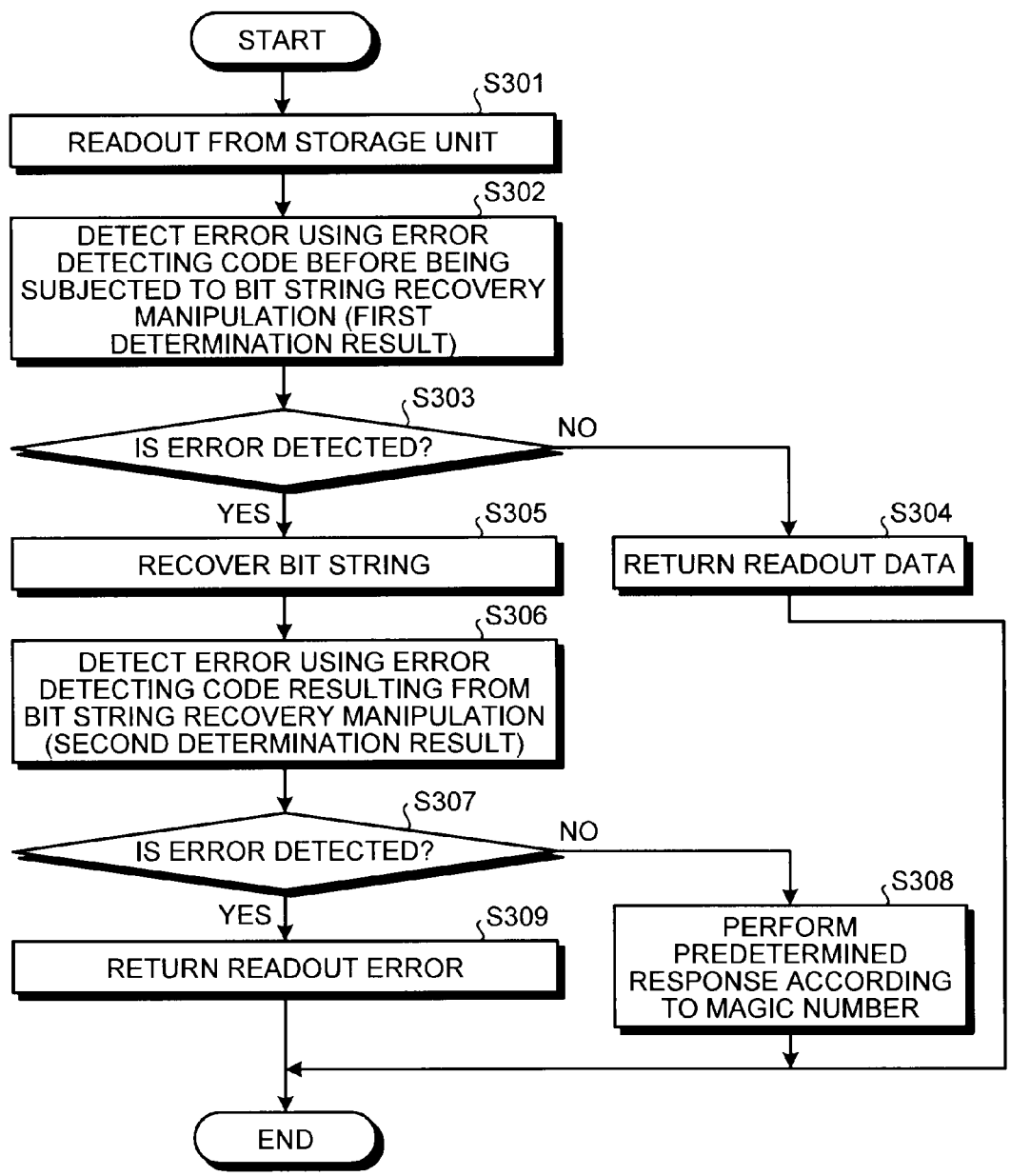
FIG. 8 illustrates an example of a readout process according to the first embodiment.

Next, an example of procedures according to the first embodiment will be described in detail with reference to the drawings. FIG. 6 illustrates an example of the writing process according to the first embodiment. FIG. 7 illustrates an example of a special data setting process according to the first embodiment. FIG. 8 illustrates an example of the readout process according to the first embodiment.

Writing Process

First, an example of the writing process according to the first embodiment will be described in detail with reference to FIG. 6. As illustrated in FIG. 6, in the writing process, an error detecting code is first generated in response to a write request from the host device (step S101). More specifically, the host interface 130 receives a write request from the host device. The write request includes logical block address information and write target data. Upon receiving the write request from the host device, the host interface 130 sends the received write request to the writing unit 114. Upon receiving the write request from the host interface 130, the writing unit 114 extracts the write target data from the write request. Subsequently, the writing unit 114 sends the extracted write target data to the first generating unit 121. The data to be sent to the first generating unit 121 may further include data other than the write target data. For example, the data may further include a bit string indicating logical block address information extracted from the write request and a predetermined bit string. Upon receiving the write target data from which an error detecting code is to be generated from the writing unit 114 that is a request source, the first generating unit 121 generates the error detecting code from the received write target data based on a predetermined method. The generated error detecting code is sent by the first generating unit 121 to the writing unit 114 that is the request source. Then, the writing unit 114 obtains the error detecting code associated with the write target data from the first generating unit 121. Note that the error detecting code may be replaced with an error correcting code. This also applies to the description below.

Next, the extracted write target data and the obtained error detecting code are written to the storage area 161 in the storage unit 160 (step S102), and then the writing process ends. More specifically, the writing unit 114 extracts the logical block address information from the write request. The writing unit 114 instructs the access unit 150 to write the write target data that are also extracted and the obtained error detecting code to the storage area 161 in the storage unit 160 associated with the extracted logical block address information. The access unit 150 writes the write target data and the error detecting code input from the writing unit 114 to the storage area 161 in the storage unit 160 associated with the logical block address information that is also input from the writing unit 114.

Special Data Setting Process

Next, an example of the special data setting process according to the first embodiment will be described in detail with reference to FIG. 7. As illustrated in FIG. 7, in the special data setting process, special data 32 including a magic number are first generated in response to a special data setting request from the host device (step S201). More specifically, the host interface 130 receives a special data setting request from the host device. The special data setting request includes logical block address information of a storage area to write to and special data identification information for identifying the type of a predetermined response. Upon receiving the special data setting request from the host device, the host interface 130 sends the received special data setting request to the special data setting unit 113. Upon receiving the special data setting request from the host interface 130, the special data setting unit 113 extracts the special data identification information from the special data setting request. Subsequently, the special data setting unit 113 generates the special data 32 including the magic number that is a bit string corresponding to the extracted special data identification information as described above referring to FIG. 5.

Next, an error detecting code is generated by using the generated special data 32 (step S202). More specifically, the special data setting unit 113 sends the generated special data 32 to the first generating unit 121. Note that the data sent to the first generating unit 121 may further include data other than the special data 32. For example, the data may further include a bit string indicating logical block address information extracted from the special data setting request and a predetermined bit string. Upon receiving the special data 32 from the special data setting unit 113 that is a request source, the first generating unit 121 generates an error detecting code from the received special data 32 based on a predetermined method. The generated error detecting code is sent from the first generating unit 121 to the special data setting unit 113 that is the request source. As a result, the special data setting unit 113 obtains the error detecting code associated with the bit string of the generated special data 32. Data constituted by the bit string of the special data 32 and the bit string of the error detecting code will be hereinafter referred to as manipulation target data.

Next, values of predetermined bits in the manipulation target data constituted by the generated special data 32 and the obtained error detecting code are manipulated (step S203). More specifically, the special data setting unit 113 sends the generated special data 32 and the obtained error detecting code as the manipulation target data to the bit string manipulating unit 111. Upon receiving the manipulation target data from the special data setting unit 113 that is the request source, the bit string manipulating unit 111 manipulates the bit string of the received manipulation target data according to a predetermined rule as described above. Then, the bit string manipulating unit 111 sends the manipulated data resulting from the bit string manipulation to the special data setting unit 113 that is the request source. As a result, the special data setting unit 113 obtains the special data 32 and the error detecting code resulting from the bit string manipulation. Note that the error detecting code may be replaced with the error correcting code as described above.

Next, the special data 32 and the error detecting code resulting from the bit string manipulation are written to the storage unit 160 (step S204), and then the special data setting process ends. More specifically, the special data setting unit 113 extracts the logical block address information from the special data setting request. The special data setting unit 113 instructs the access unit 150 to write the special data 32 and the error detecting code resulting from the bit string manipulation to the storage area 161 in the storage unit 160 associated with the extracted logical block address information. The access unit 150 writes the special data 32 and the error detecting code resulting from the bit string manipulation input from the special data setting unit 113 to the storage area 161 in the storage unit 160 associated with the logical block address information that is also input from the special data setting unit 113.

Readout Process

Next, an example of the readout process according to the first embodiment will be described in detail with reference to FIG. 8. As illustrated in FIG. 8, in the readout process, data are first read out from the storage unit 160 in response to a readout request from the host device (step S301). More specifically, the host interface 130 receives the readout request from the host device. The readout request includes logical block address information indicating a storage location of readout target data. Upon receiving the readout request from the host device, the host interface 130 sends the received readout request to the readout unit 115. Upon receiving the readout request from the host interface 130, the readout unit 115 extracts the logical block address information from the readout request. The readout unit 115 then instructs the access unit 150 to readout data stored in the storage area 161 in the storage unit 160 associated with the logical block address indicated by the extracted logical block address information. The access unit 150 reads out the data stored in the storage area 161 in the storage unit 160 associated with the logical block address indicated by the logical block address information input from the readout unit 115, and returns the readout data to the readout unit 115. As a result, the readout unit 115 obtains the readout target data.

Next, an error correction process is performed on the readout data (step S302). More specifically, the readout unit 115 sends, to the first determining unit 122, data that were stored in the user data storage area 162 as error detection target data and data that were stored in the redundant area 163 as an error detecting code out of the readout data. If data other than the data that were stored in the user data storage area 162 were further contained in the data sent from the writing unit 114 and the special data setting unit 113 to the first generating unit 121, the further contained data are also sent to the first determining unit 122 at this point. For example, if a bit string indicating logical block address information contained in a write request or a special data setting request was further contained, the bit string indicating the logical block address information extracted from the readout request is further sent to the first determining unit 122. If a predetermined bit string was further contained, the predetermined bit string is also sent to the first determining unit 122. Upon receiving the error detection target data and the error detecting code from the readout unit 115 that is a request source, the first determining unit 122 determines whether or not an error is present in the bit strings of the received error detection target data and error detecting code based on a predetermined method. The first determining unit 122 then sends the result of the determination (first determination result) to the readout unit 115 that is the request source. As a result, the readout unit 115 obtains the first determination result sent from the first determining unit 122. Note that the error detecting code may be replaced with the error correcting code as described above.

Next, it is determined whether or not an error is detected as a result of the error determination process in step S302 (step S303). More specifically, if the first determination result obtained from the first determining unit 122 shows that no error is detected (No in step S303), the process proceeds to step S304. If, on the other hand, the obtained first determination result shows that an error is detected (Yes in step S303), the process proceeds to step S305. When the error correcting code is used instead of the error detecting code, the readout unit 115 proceeds to step S304 if the first determination result shows that an error correction process is possible (No in step S303), while the readout unit 115 proceeds to step S305 if the first determination result shows that the error correction process is not possible (Yes in step S303).

In step S304, the data read out in step S301 are sent to the host device as a readout acknowledge. More specifically, the readout unit 115 sends the data that were stored in the user data storage area 162 out of the data read out in step S301 to the host interface 130 as the readout acknowledge. When the error correcting code is used instead of the error detecting code, the readout unit 115 corrects the error in the readout data. The readout unit 115 also sends data that were stored in the user data storage area 162 out of the error corrected data as the readout acknowledge to the host interface 130. The readout acknowledge includes the readout target data requested by the host device or readout state information. The readout state information is information indicating a readout state. The information indicating a readout state may be information indicating a readout error, for example. Upon receiving the readout acknowledge from the readout unit 115, the host interface 130 sends the readout acknowledge to the host device and then ends the readout process.

In step S305, the bit string of data read out in step S301 is subjected to recovery manipulation. More specifically, the readout unit 115 sends the data (the data that were stored in the user data storage area 162 and the data that were stored in the redundant area 163) read out in step S301 to the bit string recovering unit 112. Upon receiving recovery manipulation target data from the readout unit 115 that is a request source, the bit string recovering unit 112 performs the recovery manipulation of the bit string of the manipulation target data as described above. The bit string recovering unit 112 then sends data resulting from the bit string recovery manipulation to the readout unit 115 that is the request source. As a result, the readout unit 115 obtains the data resulting from the bit string recovery manipulation. Note that the error detecting code can be replaced with the error correcting code as described above.

Next, an error detection process is performed on the data resulting from the bit string recovery manipulation (step S306). More specifically, the readout unit 115 sends, to the first determining unit 122, the data resulting from the bit string recovery manipulation that were stored in the user data storage area 162 as error detection target data and the data resulting from the bit string recovery manipulation that were stored in the redundant area 163 as an error detecting code out of the data resulting from the bit string recovery manipulation obtained from the bit string recovering unit 112. If data other than the data stored in the user data storage area 162 were further contained in the data sent from the writing unit 114 and the special data setting unit 113 to the first generating unit 121, the further contained data are also sent to the first determining unit 122 at this point. For example, if a bit string indicating logical block address information contained in a write request or a special data setting request was further contained, the bit string indicating the logical block address information extracted from the readout request is further sent to the first determining unit 122. If a predetermined bit string was further contained, the predetermined bit string is also sent to the first determining unit 122. Upon receiving the error detection target data and the error detecting code from the readout unit 115 that is the request source, the first determining unit 122 determines whether or not an error is present in the received error detection target data and error detecting code based on a predetermined method. The first determining unit 122 then sends the result of the determination (second determination result) to the readout unit 115 that is the request source. Note that the error detecting code may be replaced with the error correcting code as described above.

Next, it is determined whether or not an error is detected as a result of the error determination process in step S306 (step S307). More specifically, if the second determination result obtained from the first determining unit 122 shows that no error is detected (No in step S307), the process proceeds to step S308. If, on the other hand, the obtained second determination result shows that an error is detected (Yes in step S307), the process proceeds to step S309. When the error correcting code is used instead of the error detecting code, the readout unit 115 proceeds to step S308 if the second determination result shows that an error correction process is possible (No in step S307), while the readout unit 115 proceeds to step S309 if the second determination result shows that the error correction process is not possible (Yes in step S307).

In step S308, a predetermined response is performed according to a magic number 32a in the special data 32 obtained as a result of the bit string recovery manipulation in step S305. More specifically, the readout unit 115 assumes predetermined bits in the data that were stored in the user data storage area 162 out of the data resulting from the bit string recovery manipulation obtained in step S305 to be the magic number 32a to identify the special data identification information. When the error correcting code is used instead of the error detecting code, the readout unit 115 corrects the error in the data resulting from the bit string recovery manipulation obtained in step S305, and assumes predetermined bits in the data that were stored in the user data storage area 162 out of the error corrected data to be the magic number 32a to identify the special data identification information. Subsequently, the readout unit 115 sends a predetermined acknowledge as a readout acknowledge according to the identified special data identification information to the host interface 130. Upon receiving the predetermined acknowledge from the readout unit 115, the host interface 130 sends the predetermined acknowledge as the readout acknowledge to the host device and then ends the readout process.

In step S309, on the other hand, a readout error is returned to the host device. More specifically, the readout unit 115 sends readout state information indicating a readout error as the readout acknowledge to the host interface 130. Upon receiving the readout acknowledge from the readout unit 115, the host interface 130 sends the readout error to the host device and then ends the readout process.

With the above described configuration and operations, the information on logical block addresses for which special data are set need not be managed separately according to the first embodiment. This allows the used memory capacity to be reduced. Moreover, in the readout process for a logical block address for which no special data are set, if no error is detected in data stored in the storage unit 160, a readout acknowledge can be sent to the host device only through a normally required error detection process. As a result, the normal readout process can be performed at a higher speed.

Furthermore, in the first embodiment, special data are associated with a certain logical block address by recording a magic number indicating that the stored data are special data in the storage area 161 in the storage medium associated with the logical block address. This eliminates the need of an additional recording medium for managing associations and the need of assigning the storage areas 161 in the storage unit 160 as storage areas for managing associations.

An example of a data storage device that is contrasted with the first embodiment will be described below. When a readout request for a certain logical block address is issued from a host device, the data storage device that is contrasted performs in parallel an address determination process of determining whether or not a predetermined response is set for the logical block address and a data readout process of reading out user data associated with the address from a recording medium. Then, if the result of address determination is true, the data storage device discards the user data that are read out in parallel and performs a predetermined response instead. If, on the other hand, the result of address determination is false, the data storage device returns the user data that are read out in parallel to the host.

Examples of the "predetermined response" to be performed by the data storage device when the special data are set can include the following patterns of functions:

(1) return a predetermined value in the same format as the normal response with user data; and (2) return a predetermined state in a format different from that of the normal response with user data.

In pattern (1), if a readout request for a logical block address is issued by the host device after the data storage device is instructed to initialize data recorded at the logical block address by the host device, for example, the data storage device returns to the host device a predetermined value indicating that data are initialized in the same format as the normal response with user data.

In pattern (2), if a readout request for a logical block address is issued by the host device after the data storage device is instructed that reading out of data at the logical block address shall results in an error by the host device, for example, the data storage device returns to the host device a predetermined value indicating an error state in a format different from that of the normal response with user data.

The functions as in the patterns (1) and (2) can also be implemented by using the following technique. Information on defective areas (bad sectors) in the recording medium is recorded in a predetermined storage area in the recording medium. For processing a readout request for an address, it is determined whether or not the address is associated with a defective area based on the information stored in the predetermined storage area. If the address is associated with a defective area, a predetermined response is performed. In a process of setting so that a predetermined response is to be performed in response to a readout request for a certain logical block address by using the above configuration, information representing association between the logical block address and the predetermined response is stored in the predetermined storage area. For processing a readout request for a logical block address, information stored in a predetermined area is referred to and it is determined whether or not a predetermined response is set for the logical block address. If a predetermined response is set, the storage device can implement a function of performing the predetermined response according to the information.

In this manner, the functions as described above can also be implemented by separately managing logical block addresses for which it is set to perform a predetermined response in response to a readout request. However, the following disadvantages may be caused as a result of separately managing associations of special data as described above. The special data are set for each logical block address. Therefore, as the maximum value of available logical block addresses increases with the increase in the capacity of the data storage device, the amount of information to be managed is also increased.

Accordingly, either one of the following two approaches as described as examples below may be employed:

(1) set an upper limit to the number of logical block addresses for which special data can be set; or (2) manage management information in a flat data structure such as a table and read out necessary information as needed from a storage medium.

However, there may be the following disadvantages in each of the approaches (1) and (2). According to the approach (1), the amount of management information can be reduced by setting an upper limit to the number of logical block addresses for which special data can be set. In this approach, however, the number of special data that can be set is limited. Moreover, it is practical in this approach to manage management information in a data structure such as a list. However, since a process of searching the list is needed to determine whether or not special data are set for a logical block address, it may take much time for the process as a result.

In the approach (2), a table for managing management information is stored in a storage medium. In response to a readout request from a host device, necessary information in the table is read out from the storage medium as needed. With such a configuration, it is possible to reduce required amount of memory. Moreover, in the approach (2), the process of searching the list is not necessary unlike the approach (1). However, it may take much time for the process of reading out from the storage medium. In addition, an area for saving the management information has to be reserved additionally in the storage medium.

In a data storage device such as a hard disk drive (HDD) that requires relatively much time for reading out from a storage medium, problems such as a problem that the response time for the normal response is depended on the time taken for address determination are less likely to occur by adopting the approach (1). This is because the time for the address determination process can be hidden behind the time for the data readout process by performing the address determination process and the data readout process in parallel in a data storage device in which the time for the data readout process is normally longer than the time for the address determination process such as an HDD that requires relatively much time for reading out from a storage medium.

However, in a data storage device such as a solid state drive (SSD) that requires relatively less time for reading out from a storage medium, the time for the address determination process cannot be hidden behind the time for the data readout process in some cases. In such case, the response time for the normal response may be longer than in a data storage device that does not have a special data setting function.

In the first embodiment, in contrast, the information on logical block addresses for which special data are set need not be managed separately. This allows the used memory capacity to be reduced. Moreover, in the readout process for a logical block address in which no special data are set, if no error is detected in data stored in the storage unit 160, a readout acknowledge can be sent to the host device only through a normally required error detection process. As a result, the normal readout process can be performed at a higher speed.

Furthermore, in the first embodiment, special data are associated with a certain logical block address by recording a magic number indicating that the stored data are special data in the storage area 161 in the storage medium associated with the logical block address. This eliminates the need of an additional recording medium for managing associations and the need of assigning the storage areas 161 in the storage unit 160 as storage areas for managing associations.

Second Embodiment

Next, a controller, a data storage device and a program according to a second embodiment will be exemplified. In the following description, components similar to those in the first embodiment will be designated by the same reference numerals and redundant description thereof will not be repeated.

In the first embodiment as described above, an incorrect response may be returned to the host device in a case where, as a result of an error occurred in a bit string of data stored in the storage unit 160 as special data 32, the bit string of the data resulting from the bit string manipulation in which the error is occurred becomes identical to the bit string resulting from the bit string recovery manipulation performed by the bit string recovering unit 112 by accident, or the bit string in which the error is occurred becomes in a correctable range, or in a case where, as a result of an error occurred in a bit string of data stored in the storage unit 160 as normal user data, the bit string of data in which the error is occurred becomes identical to the bit string resulting from the bit string manipulation performed by the bit string manipulating unit 111 by accident, or the bit string in which the error is occurred is subjected to the bit string recovery manipulation performed by the bit string recovering unit 112 and the error of the bit string resulting from the bit string recovery manipulation becomes in a correctable range, although the incorrect response need not necessarily be regarded as an erroneous operation. Therefore, the second embodiment provides an example in which two or more error detecting codes are used so as to avoid occurrence of such cases.

Configuration

Figure 9:
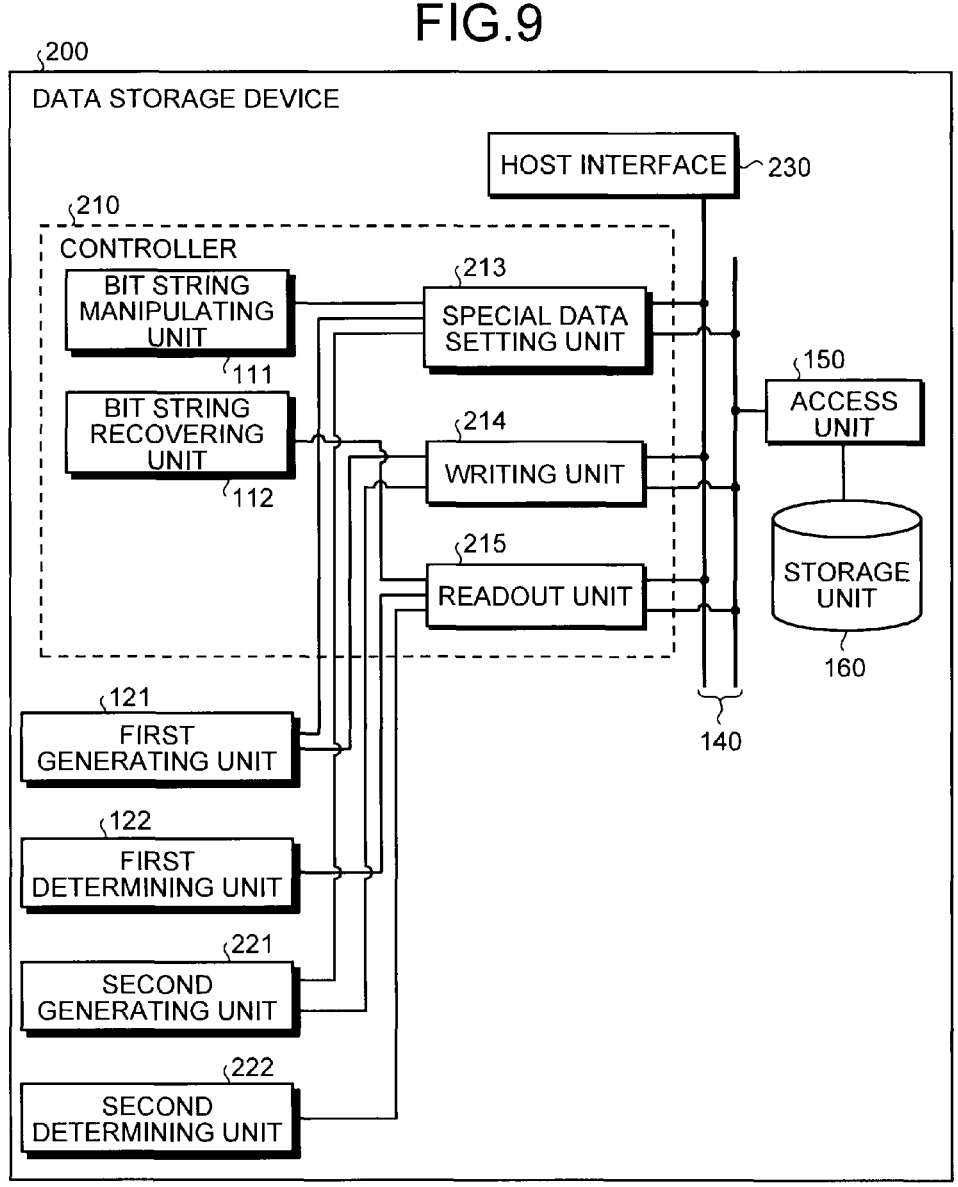
FIG. 9 is a diagram showing a schematic configuration of a data storage device according to a second embodiment.

FIG. 9 illustrates a schematic configuration of a data storage device 200 according to the second embodiment. As is apparent from comparison between FIG. 9 and FIG. 1, the data storage device 200 (FIG. 9) has a configuration similar to that of the data storage device 100 (FIG. 1). In the data storage device 200, however, the controller 110 and the host interface 130 in the data storage device 100 are replaced with a controller 210 and a host interface 230, respectively. In addition, the data storage device 200 further includes a second generating unit 221 and a second determining unit 222.

The controller 210 has a configuration similar to that of the controller 110 illustrated in FIG. 1, in which the special data setting unit 113, the writing unit 114 and the readout unit 115 are replaced with a special data setting unit 213, a writing unit 214 and a readout unit 215, respectively. The controller 210 is interconnected with the access unit 150 and the host interface 230 via the data bus 140, for example.

The host interface 230 is similar to the host interface 130 except that the host interface 230 cooperates with functional units of the writing unit 214 instead of the writing unit 114, the special data setting unit 213 instead of the special data setting unit 113, and the readout unit 215 instead of the readout unit 115. Therefore, detailed description thereof will not be repeated.

The second generating unit 221 receives data from which an error detecting code (which will be referred to as a second error detecting code for convenience sake) is generated from a request source of the error detecting code. The second generating unit 221 generates the second error detecting code from the received data based on a predetermined method. The second generating unit 221 then sends the generated second error detecting code to the request source. Note that the error detecting code may be replaced with an error correcting code herein. If the second error detecting code is generated by the same method as the error detecting code (which will be referred to as a first error detecting code for convenience sake) generated by the first generating unit 121, the first generating unit 121 may be used in place of the function of the second generating unit 221. In this case, the second generating unit 221 can be omitted.

The second determining unit 222 receives error detection target data and a second error detecting code associated therewith from a request source of error determination. The second determining unit 222 performs an error determination process of determining whether or not an error is present in the received error detection target data and second error detecting code based on a predetermined method. The second determining unit 222 then sends the result of the error determination process to the request source. When the error detecting code is replaced with the error correcting code, the error determination process is replaced with "an error determination process of determining whether or not error correction of the received error correction target data and error correcting code is possible based on a predetermined method". If the method of error determination performed by the second determining unit 222 is the same as that performed by the first determining unit 122, the first determining unit 122 may be used in place of the function of the second determining unit 222. In this case, the second determining unit 222 can be omitted.

The writing unit 214 receives a write request from the host interface 230. The writing unit 214 extracts write target data from the received write request. The writing unit 214 then sends the extracted write target data to the first generating unit 121, and obtains a first error detecting code associated with the write target data. The data to be sent to the first generating unit 121 may further include data other than the write target data. For example, the data may further include a bit string indicating logical block address information extracted from the received write request and a predetermined bit string.

The writing unit 214 also sends the extracted write target data and the obtained first error detecting code to the second generating unit 221, and obtains a second error detecting code associated with the bit strings thereof. The data to be sent to the second generating unit 221 may further include data other than the write target data and the first error detecting code. For example, the data may further include a bit string indicating logical block address information extracted from the received write request and a predetermined bit string.

Figure 10:
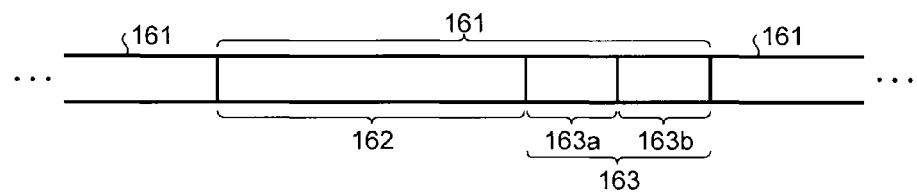
FIG. 10 illustrates an example of a storage area according to the second embodiment.

The writing unit 214 further extracts the logical block address information of a storage area to write to from the received write request. The writing unit 214 instructs the access unit 150 to write the write target data and the first and second error detecting codes to the storage area 161 in the storage unit 160 associated with the extracted logical block address information. FIG. 10 illustrates an example of data alignment in the storage area 161 in the storage unit 160. As illustrated in FIG. 10, the write target data are stored in a user data storage area 162 of a storage area 161 in the storage unit 160. The first error detecting code is stored in a first redundant area 163a in a redundant area 163 of the storage area 161, and the second error detecting code is stored in a second redundant area 163b in the redundant area 163. However, the data alignment in each storage area 161 is not limited to that illustrated in FIG. 10.

The special data setting unit 213 receives a special data setting request from the host interface 230. The special data setting unit 213 extracts special data identification information for identifying the type of a predetermined response from the special data setting request. The special data setting unit 213 also generates special data 32 (see FIG. 4A) including a bit string of magic number corresponding to the type of the extracted predetermined response. The method for generating the special data 32 is the same as in the special data setting unit 113 in the first embodiment.

The special data setting unit 213 sends the generated special data 32 to the first generating unit 121 and obtains a first error detecting code associated with the bit string of the special data 32. The data sent to the first generating unit 121 may further include data other than the special data 32. For example, the data may further include a bit string indicating logical block address information extracted from the received special data setting request and a predetermined bit string.

The special data setting unit 213 then sends the special data 32 and the first error detecting code to the bit string manipulating unit 111, and obtains the special data 32 and the first error detecting code resulting from bit string manipulation.

The special data setting unit 213 further sends the special data 32 and the first error detecting code resulting from the bit string manipulation to the second generating unit 221 and obtains a second error detecting code associated with the bit strings thereof. The data to be sent to the second generating unit 221 may further include data other than the special data 32 and the first error detecting code resulting from the bit string manipulation. For example, the data may further include a bit string indicating logical block address information extracted from the received special data setting request and a predetermined bit string.

Furthermore, the special data setting unit 213 extracts the logical block address information from the received special data setting request. The special data setting unit 213 instructs the access unit 150 to write the special data 32 and the first error detecting code resulting from the bit string manipulation and the second error detecting code to the storage area 161 in the storage unit 160 associated with the extracted logical block address information.

The special data 32 resulting from the bit string manipulation are stored in the user data storage area 162 in FIG. 10. The first error detecting code resulting from the bit string manipulation is stored in the first redundant area 163a in the redundant area 163 of the storage area 161, and the second error detecting code is stored in the second redundant area 163b in the redundant area 163. However, the data alignment in each storage area 161 is not limited to that illustrated in FIG. 10.

The readout unit 215 receives a readout request from the host interface 230. The readout unit 215 extracts logical block address information from the received readout request. The readout unit 215 instructs the access unit 150 to readout data stored in the storage area 161 in the storage unit 160 associated with the logical block address indicated by the extracted logical block address information, and obtains data read out in response thereto.

The alignment of the data read out by the readout unit 215 is a predetermined alignment such as the alignment illustrated in FIG. 10, for example. Accordingly, in the description below, data read out from the user data storage area 162 are referred to as first data, data read out from the first redundant area 163a are referred to as second data, and data read out from the second redundant area 163b are referred to as third data out of the data read out by the readout unit 215. Note that the first data are the write target data that are not subjected to the bit string manipulation or the special data 32 resulting from the bit string manipulation. The second data are the first error detecting code that is not subjected to the bit string manipulation or the first error detecting code resulting from the bit string manipulation. The third data are the second error detecting code that is not subjected to the bit string manipulation.

The readout unit 215 sends, to the second determining unit 222, the first data and the second data as error detection target data and the third data as an error detecting code associated with the error detection target data out of the readout data. If data other than the first and second data were further contained in the data sent from the writing unit 214 and the special data setting unit 213 to the second generating unit 221, the further contained data are also sent to the second determining unit 222 at this point. For example, if a bit string indicating logical block address information contained in a write request or a special data setting request was further contained, the bit string indicating the logical block address information extracted from the readout request is further sent to the second determining unit 222. For another example, if a predetermined bit string was further contained, the predetermined bit string is also sent to the second determining unit 222. The readout unit 215 then obtains a third determination result sent from the second determining unit 222.

If the third determination result obtained from the second determining unit 222 shows that an error is detected or that the error correction process is not possible, the readout unit 215 sends readout state information indicating a readout error as the readout acknowledge to the host interface 230.

If, on the other hand, the third determination result obtained from the second determining unit 222 shows that no error is detected, the readout unit 215 sends, to the first determining unit 122, the first data as error detection target data and the second data as the error detecting code associated with the error detection target data out of the data read out from the storage area 161. When the error correcting code is used instead of the error detecting code generated by the second generating unit 221, and if the third determination result shows that the error correction process is possible, the readout unit 215 corrects the error of the readout data. The error corrected data will be hereinafter referred to as first error corrected data. The readout unit 215 also sends, to the first determining unit 122, the first data as error correction target data and the second data as an error detecting code associated with the error detection target data out of the first error corrected data. If data other than the first data were further contained in the data sent from the writing unit 214 and the special data setting unit 213 to the first generating unit 121, the further contained data are also sent to the first determining unit 122 at this point. For example, if a bit string indicating logical block address information contained in a write request or a special data setting request was further contained, the bit string indicating the logical block address information extracted from the readout request is further sent to the first determining unit 122. For another example, if a predetermined bit string was further contained, the predetermined bit string is also sent to the first determining unit 122. The readout unit 215 obtains a fourth determination result sent from the first determining unit 122.

If the fourth determination result obtained from the first determining unit 122 shows that no error is detected, the readout unit 215 sends a readout acknowledge containing the first data as the data requested by the host device out of the data read out from the storage area 161 to the host interface 230. When the error correcting code is used instead of the error detecting code generated by the second generating unit 221, and if the obtained fourth determination result shows that the error correction process is possible, the readout unit 215 sends, to the host interface 230, a readout acknowledge containing the first data as the data requested by the host device out of the first error corrected data. This is because an error occurred in data recorded in the storage unit 160 is no longer present in the first error corrected data obtained by correcting the error. On the other hand, if the bit string has been manipulated, a result showing that the error correction process is not possible can always be obtained in the fourth determination result from the first determining unit 122. Therefore, if a result showing that the error correction process is possible is obtained, the error correction process need not be performed.

However, as a result of an error occurred in the bit string of the data stored in the storage unit 160 as the special data 32, there may be a case in which the first data (the bit string of magic number resulting from the bit string manipulation) and the second data (the first error detecting code resulting from the bit string manipulation) become identical to the bit strings resulting from the bit string recovery manipulation performed by the bit string recovering unit 112 by accident. Even in such case, the third determination result from the second determining unit 222 shows that an error is detected or that the error correction is not possible and a readout error is returned to the host device, or the third determination result shows that the error is in a correctable range and the error is corrected. Accordingly, the readout acknowledge containing the first data read out from the storage area 161 as the data will never be returned to the host interface 230. Specifically, in response to a readout request for a logical block address that is not associated with any special data 32 and for which no error is occurred, a readout acknowledge can be sent to the host device through a normally required error detection process as described above. As a result, the normal readout process can be performed at a higher speed.

If, on the other hand, the fourth determination result obtained from the first determining unit 122 shows that an error is detected, the readout unit 215 sends the first data and the second data out of the data read out from the storage area 161 to the bit string recovering unit 112, and obtains data resulting from the bit string recovery manipulation therefrom. When the error correcting code is used instead of the error detecting code, and if the fourth determination result shows that the error correction process is not possible, the readout unit 215 sends the first data and the second data out of the first error corrected data to the bit string recovering unit 112, and obtains data resulting from the bit string recovery manipulation.

The readout unit 215 also sends, to the first determining unit 122, data associated with the location of the first data out of the obtained data resulting from the bit string recovery manipulation as error detection target data and data associated with the location of the second data out of the obtained data resulting from the bit string recovery manipulation as an error detecting code associated with the error detection target data. If data other than the first data were further contained in the data sent from the writing unit 214 and the special data setting unit 213 to the first generating unit 121, the further contained data are also sent to the first determining unit 122 at this point. For example, if a bit string indicating logical block address information contained in a write request or a special data setting request was further contained, the bit string indicating the logical block address information extracted from the readout request is further sent to the first determining unit 122. For another example, if a predetermined bit string was further contained, the predetermined bit string is also sent to the first determining unit 122. The readout unit 215 obtains a fifth determination result sent from the first determining unit 122.

The readout unit 215 confirms that the fifth determination result obtained from the first determining unit 122 shows that no error is detected. When the error correcting code is used instead of the error detecting code generated by the first generating unit 121, the readout unit 215 confirms that the fifth determination result shows that the error correction process is possible.

However, as a result of an error occurred in a bit string of the data stored in the storage unit 160 as normal user data, there may be a case in which the first data (write target data) and the second data (the first error detecting code) become identical to the bit strings resulting from the bit string manipulation performed by the bit string manipulating unit 111 by accident. Even in such case in the second embodiment, the third determination result shows that an error is detected or that the error correction is not possible and a readout error is returned to the host device, or the third determination result shows that an error is in a correctable range and the error is corrected. Accordingly, an error is never detected in the confirmation process unlike the first embodiment. In addition, even in a case where an error is occurred in a bit string of data stored in the storage unit 160 differently from the result of the bit string manipulation performed by the bit string manipulating unit 111, the third determination result shows that an error is detected or that the error correction is not possible and a readout error is returned to the host device, or the third determination result shows that an error is in a correctable range and the error is corrected. Accordingly, an error is never detected in the confirmation process unlike the first embodiment. When the error correcting code is used instead of the error detecting code, a result showing that the error correction process is possible is confirmed as the fifth determination result, but no error is detected in the fifth determination result for the reason described above. Therefore, the error correction process subsequent to the fifth determination result can be omitted. Specifically, the process of sending predetermined data to the first determining unit 122 by the readout unit 215 so as to obtain the fifth determination result and the process of confirming the fifth determination result by the readout unit 215 may be omitted.

The readout unit 215 also assumes data associated with the location of the first data out of the data resulting from the bit string recovery manipulation obtained from the first determining unit 122 to be a magic number to identify the special data identification information. The readout unit 215 sends a predetermined acknowledge corresponding to the identified special data identification information to the host interface 230.

Operations

Figure 11:
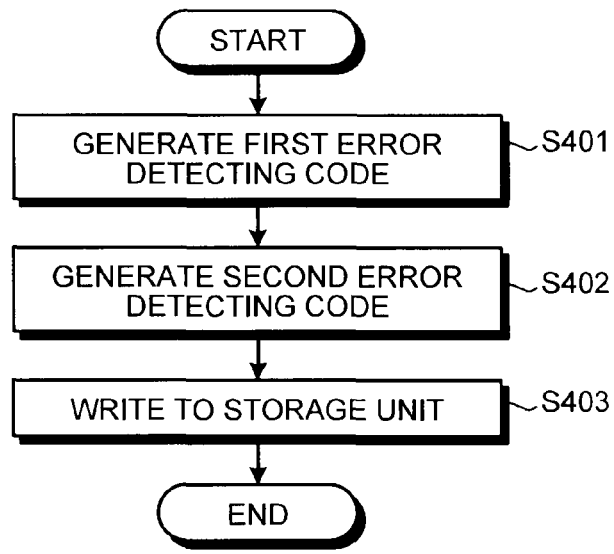
FIG. 11 illustrates an example of a writing process according to the second embodiment.
Figure 12:
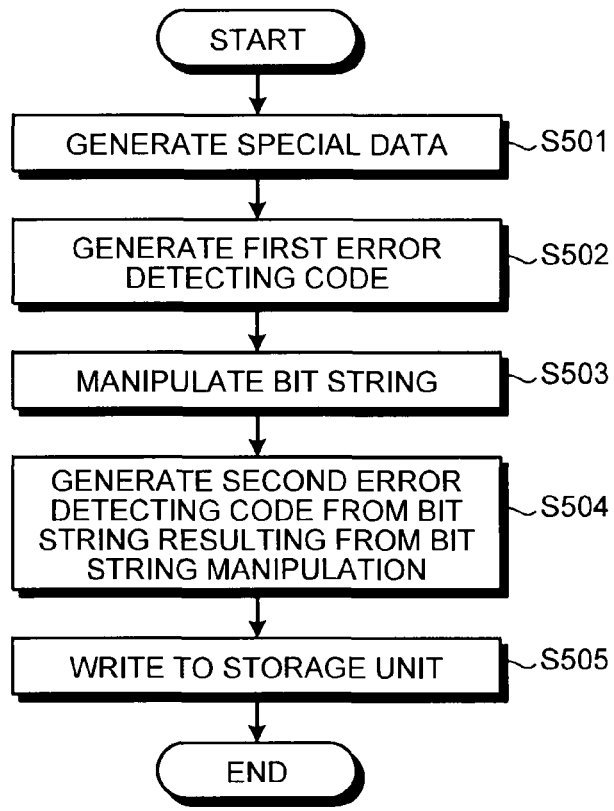
FIG. 12 illustrates an example of a special data setting process according to the second embodiment.
Figure 13:
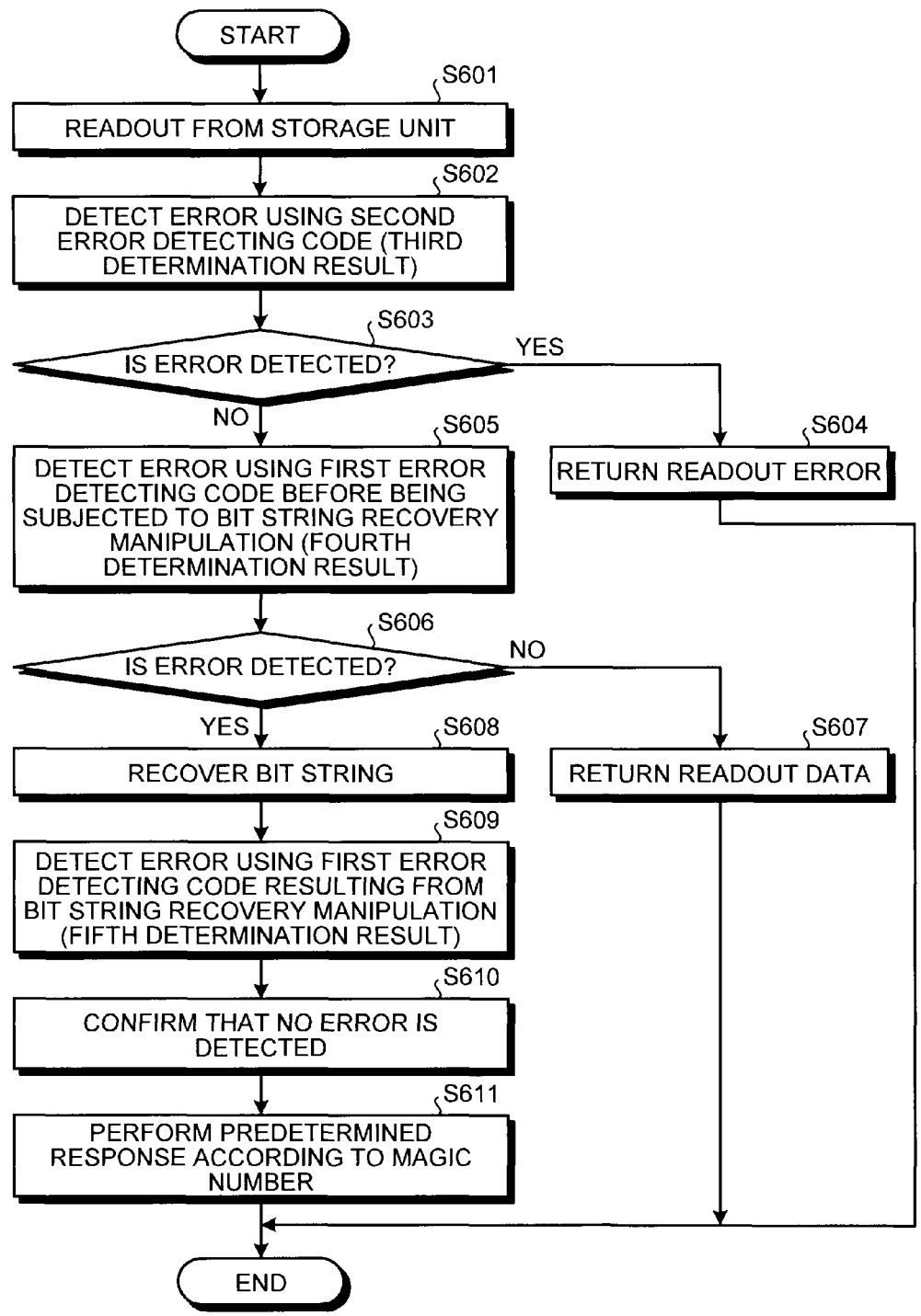
FIG. 13 illustrates an example of a readout process according to the second embodiment.

Next, an example of procedures according to the second embodiment will be described in detail with reference to the drawings. FIG. 11 illustrates an example of a writing process according to the second embodiment. FIG. 12 illustrates an example of a special data setting process according to the second embodiment. FIG. 13 illustrates an example of a readout process according to the second embodiment.

Writing Process

First, an example of the writing process according to the second embodiment will be described in detail with reference to FIG. 11. As illustrated in FIG. 11, in the writing process, a first error detecting code is first generated in response to a write request from the host device (step S401). More specifically, the host interface 230 receives a write request from the host device. The write request includes logical block address information and write target data. Upon receiving the write request from the host device, the host interface 230 sends the received write request to the writing unit 214. Upon receiving the write request from the host interface 230, the writing unit 214 extracts the write target data from the received write request. Subsequently, the writing unit 214 sends the extracted write target data to the first generating unit 121. The data to be sent to the first generating unit 121 may further include data other than the write target data. For example, the data may further include a bit string indicating logical block address information extracted from the write request and a predetermined bit string. Upon receiving the write target data from which the first error detecting code is to be generated from the writing unit 214 that is a request source, the first generating unit 121 generates the error detecting code from the received write target data based on a predetermined method. The generated first error detecting code is sent by the first generating unit 121 to the writing unit 214 that is the request source. Then, the writing unit 214 obtains the first error detecting code associated with the write target data from the first generating unit 121. Note that the error detecting code may be replaced with the error correcting code in the description including the description below.

Next, a second error detecting code is generated (step S402). More specifically, the writing unit 214 sends the extracted write target data and the obtained first error detecting code to the second generating unit 221. The data to be sent to the second generating unit 221 may further include data other than the write target data and the first error detecting code. For example, the data may further include a bit string indicating logical block address information extracted from the write request and a predetermined bit string. Upon receiving the write target data and the first error detecting code from which the second error detecting code is to be generated from the writing unit 214 that is a request source, the second generating unit 221 generates the second error detecting code from the bit strings thereof based on a predetermined method. The generated second error detecting code is sent by the second generating unit 221 to the writing unit 214 that is the request source. Then, the writing unit 214 obtains the second error detecting code associated with the write target data and the first error detecting code from the second generating unit 221. If the second error detecting code is generated by the same method as the first error detecting code, the second error detecting code may be generated by using the first generating unit 121 in place of the second generating unit 221. In this case, the second generating unit 221 can be omitted.

Next, the extracted write target data and the obtained first and second error detecting codes are written to the storage area 161 in the storage unit 160 (step S403), and then the writing process ends. More specifically, the writing unit 214 extracts the logical block address from the write request. The writing unit 214 instructs the access unit 150 to write the write target data that are also extracted and the obtained first and second error detecting codes to the storage area 161 in the storage unit 160 associated with the extracted logical block address information. The access unit 150 writes the write target data and the first and second error detecting codes input from the writing unit 214 to the storage area 161 in the storage unit 160 associated with the logical block address information that is also input from the writing unit 214. As described with reference to FIG. 10, the write target data are stored in the user data storage area 162 in the storage area 161. The first error detecting code is stored in the first redundant area 163a in the redundant area 163 of the storage area 161, and the second error detecting code is stored in the second redundant area 163b in the redundant area 163. However, the storage areas are not limited thereto.

Special Data Setting Process

Next, an example of the special data setting process according to the second embodiment will be described in detail with reference to FIG. 12. As illustrated in FIG. 12, in the special data setting process, special data 32 including a magic number are first generated in response to a special data setting request from the host device (step S501). More specifically, the host interface 230 receives a special data setting request. The special data setting request includes logical block address information of a storage area to write to and special data identification information for identifying the type of a predetermined response. Upon receiving the special data setting request from the host device, the host interface 230 sends the received special data setting request to the special data setting unit 213. Upon receiving the special data setting request from the host interface 230, the special data setting unit 213 extracts the special data identification information from the special data setting request. Subsequently, the special data setting unit 213 generates the special data 32 including the magic number that is a bit string corresponding to the extracted special data identification information. The method for generating the special data 32 is the same as in the special data setting unit 113.

Next, a first error detecting code is generated by using the generated special data 32 (step S502). More specifically, the special data setting unit 213 sends the generated special data 32 to the first generating unit 121. Note that the data sent to the first generating unit 121 may further include data other than the special data 32. For example, the data may further include a bit string indicating logical block address information extracted from the special data setting request and a predetermined bit string. Upon receiving the special data 32 from the special data setting unit 213 that is the request source, the first generating unit 121 generates the first error detecting code from the received special data 32 based on a predetermined method. The generated first error detecting code is sent from the first generating unit 121 to the special data setting unit 213 that is the request source. As a result, the special data setting unit 213 obtains the first error detecting code associated with the bit string of the generated special data 32.

Next, values of predetermined bits in the manipulation target data constituted by the generated special data 32 and the obtained first error detecting code are manipulated (step S503). More specifically, the special data setting unit 213 sends the generated special data 32 and the obtained first error detecting code as the manipulation target data to the bit string manipulating unit 111. Upon receiving the manipulation target data from the special data setting unit 213 that is the request source, the bit string manipulating unit 111 manipulates the bit string of the received manipulation target data according to a predetermined rule as described above. Then, the bit string manipulating unit 111 sends the manipulation target data resulting from the bit string manipulation to the special data setting unit 213 that is the request source. As a result, the special data setting unit 213 obtains the special data 32 and the first error detecting code resulting from the bit string manipulation. Note that the error detecting code may be replaced with the error correcting code as described above.

Next, a second error detecting code is generated from the special data 32 and the first error detecting code resulting from the bit string manipulation (step S504). More specifically, the special data setting unit 213 sends the special data 32 and the first error detecting code resulting from the bit string manipulation to the second generating unit 221. The data to be sent to the second generating unit 221 may further include data other than the obtained special data 32 and first error detecting code resulting from the bit string manipulation. For example, the data may further include a bit string indicating logical block address information extracted from the special data setting request and a predetermined bit string. Upon receiving the special data 32 and the first error detecting code resulting from the bit string manipulation from the special data setting unit 213 that is the request source, the second generating unit 221 generates the second error detecting code from the received special data 32 and first error detecting code based on a predetermined method. The generated second error detecting code is sent from the second generating unit 221 to the special data setting unit 213 that is the request source. As a result, the special data setting unit 213 obtains the second error detecting code associated with the special data 32 and the first error detecting code resulting from the bit string manipulation. If the second error detecting code is generated by the same method as the first error detecting code, the first generating unit 121 may be used in place of the function of the second generating unit 221.

Next, the special data 32 and the first error detecting code resulting from the bit string manipulation and the obtained second error detecting code are written to the storage area 161 in the storage unit 160 (step S505), and then the writing process ends. More specifically, the special data setting unit 213 extracts the logical block address information from the special data setting request. The special data setting unit 213 instructs the access unit 150 to write the special data 32 and the first error detecting code resulting from the bit string manipulation and the obtained second error detecting code to the storage area 161 in the storage unit 160 associated with the extracted logical block address information. The access unit 150 writes the special data 32 and the first error detecting code resulting from the bit string manipulation and the obtained second error detecting code to the storage area 161 in the storage unit 160 associated with the extracted logical block address information. The special data 32 resulting from the bit string manipulation are stored in the user data storage area 162. In addition, as illustrated in FIG. 10, the first error detecting code resulting from the bit string manipulation is stored in the first redundant area 163a in the redundant area 163, and the second error detecting code is stored in the second redundant area 163b in the redundant area 163. However, the storage areas are not limited thereto.

Readout Process

Next, an example of the readout process according to the second embodiment will be described in detail with reference to FIG. 13. As illustrated in FIG. 13, in the readout process, data are first read out from the storage unit 160 in response to a readout request from the host device (step S601). More specifically, the host interface 230 receives the readout request from the host device. The readout request includes logical block address information indicating a storage location of readout target data. Upon receiving the readout request from the host device, the host interface 230 sends the received readout request to the readout unit 215. Upon receiving the readout request from the host interface 230, the readout unit 215 extracts the logical block address information from the received readout request. The readout unit 215 then instructs the access unit 150 to readout data stored in the storage area 161 in the storage unit 160 associated with the logical block address indicated by the extracted logical block address information. The access unit 150 reads out the data stored in the storage area 161 in the storage unit 160 associated with the logical block address indicated by the logical block address information input from the readout unit 215, and returns the readout data to the readout unit 215. As a result, the readout unit 215 obtains the readout target data.

Next, an error detection process using the second error detecting code is performed on the readout data (step S602). More specifically, the readout unit 215 sends, to the second determining unit 222, the first data and the second data as error detection target data and the third data as the second error detecting code out of the readout data. If data other than the first and second data were further contained in the data sent from the writing unit 214 and the special data setting unit 213 to the second generating unit 221, the further contained data are also sent to the second determining unit 222 at this point. For example, if a bit string indicating logical block address information contained in a write request or a special data setting request was further contained, the bit string indicating the logical block address information extracted from the readout request is further sent to the second determining unit 222. For another example, if a predetermined bit string was further contained, the predetermined bit string is also sent to the second determining unit 222. Upon receiving the first and second data from the readout unit 215 that is the request source, the second determining unit 222 determines whether or not an error is present in the received first and second data based on a predetermined method. The second determining unit 222 then sends the result of the determination (third determination result) to the readout unit 215 that is the request source. As a result, the readout unit 215 obtains the third determination result sent from the second determining unit 222. Note that the error detecting code may be replaced with the error correcting code as described above.

Next, it is determined whether or not an error is detected as a result of the error determination process in step S602 (step S603). More specifically, if the third determination result obtained from the second determining unit 222 shows that an error is detected (Yes in step S603), the process proceeds to step S604. If, on the other hand, the obtained third determination result shows that no error is detected (No in step S603), the process proceeds to step S605. When the error correcting code is used instead of the error detecting code, the readout unit 215 proceeds to step S604 if the third determination result shows that the error correction process is not possible (Yes in step S603), while the readout unit 215 proceeds to step S605 if the third determination result shows that the error correction process is possible (Yes in step S603).

In step S604, a readout error is sent in response to the readout request from the host device. More specifically, the readout unit 215 sends readout state information indicating a readout error as the readout acknowledge to the host interface 230. Upon receiving the readout acknowledge from the readout unit 215, the host interface 230 sends the readout error to the host device and then ends the readout process.

In step S605, an error detection process using the first error detecting code that is the second data is performed on the first data and the second data out of the readout data. More specifically, the readout unit 215 sends, to the first determining unit 122, the first data as error detection target data and the second data as the first error detecting code out of the readout data. When the error correcting code is used instead of the error detecting code generated by the second generating unit 221, the readout unit 215 corrects the error in the first and second data. The error corrected first and second data will be hereinafter referred to as first error corrected data. The readout unit 215 also sends, to the first determining unit 122, the first data as the error correction target data and the second data as the first error detecting code out of the first error corrected data. If data other than the first data were further contained in the data sent from the writing unit 214 and the special data setting unit 213 to the first generating unit 121, the further contained data are also sent to the first determining unit 122 at this point. For example, if a bit string indicating logical block address information contained in a write request or a special data setting request was further contained, the bit string indicating the logical block address information extracted from the readout request is further sent to the first determining unit 122. For another example, if a predetermined bit string was further contained, the predetermined bit string is also sent to the first determining unit 122. Upon receiving the error detection target data and the first error detecting code from the readout unit 215 that is the request source, the first determining unit 122 determines whether or not an error is present in the received error detection target data and first error detecting code based on a predetermined method. The first determining unit 122 then sends the result of the determination (fourth determination result) to the readout unit 215 that is the request source. Note that the error detecting code may be replaced with the error correcting code as described above.

Next, it is determined whether or not an error is detected as a result of the error determination process in step S605 (step S606). More specifically, if the fourth determination result obtained from the first determining unit 122 shows that no error is detected (No in step S606), the process proceeds to step S607. If, on the other hand, the obtained fourth determination result shows that an error is detected (Yes in step S606), the process proceeds to step S608. When the error correcting code is used instead of the error detecting code, the readout unit 215 proceeds to step S607 if the fourth determination result shows that the error correction process is possible (No in step S606), while the readout unit 215 proceeds to step S608 if the fourth determination result shows that the error correction process is not possible (Yes in step S606).

In step S607, the data read out in step S601 are sent to the host device as a readout acknowledge. More specifically, the readout unit 215 sends the first data as the readout acknowledge out of the data read out in step S601 to the host interface 230. When the error correcting code is used instead of the error detecting code generated by the second generating unit 221, the readout unit 215 corrects the error in the readout data to obtain the first error corrected data as described above. Accordingly, the readout unit 215 sends the first data out of the first error corrected data as the readout acknowledge to the host interface 230. Upon receiving the readout acknowledge from the readout unit 215, the host interface 230 sends the readout acknowledge to the host device and then ends the readout process.

In step S608, the bit string of data read out in step S601 is subjected to recovery manipulation. More specifically, if the fourth determination result obtained in step S605 shows that an error is detected, the readout unit 215 sends the first and second data out of the data read out in step S601 to the bit string recovering unit 112. When the error correcting code is used instead of the error detecting code generated by the second generating unit 221, the readout unit 215 sends the first and second data out of the first error corrected data to the bit string recovering unit 112 if the fourth determination result shows that the error correction process is not possible. Upon receiving the first and second data that are recovery manipulation target from the readout unit 215 that is the request source, the bit string recovering unit 112 performs the recovery manipulation of the bit string of the data as described above. The bit string recovering unit 112 then sends data resulting from the bit string recovery manipulation to the readout unit 215 that is the request source. As a result, the readout unit 215 obtains the data resulting from the bit string recovery manipulation. Note that the error detecting code can be replaced with the error correcting code as described above.

Next, an error detection process using the first error detecting code is performed on the data resulting from the bit string recovery manipulation (step S609). More specifically, the readout unit 215 sends, to the first determining unit 122, data associated with the location of the first data as error detection target data and data associated with the location of the second data as the first error detecting code out of the data resulting from the bit string recovery manipulation obtained from the bit string recovering unit 112. If data other than the first data were further contained in the data sent from the writing unit 214 and the special data setting unit 213 to the first generating unit 121, the further contained data are also sent to the first determining unit 122 at this point. For example, if a bit string indicating logical block address information contained in a write request or a special data setting request was further contained, the bit string indicating the logical block address information extracted from the readout request is further sent to the first determining unit 122. For another example, if a predetermined bit string was further contained, the predetermined bit string is also sent to the first determining unit 122. Upon receiving the error detection target data and the first error detecting code from the readout unit 215 that is the request source, the first determining unit 122 determines whether or not an error is present in the received error detection target data and first error detecting code based on a predetermined method. The first determining unit 122 then sends the result of the determination (fifth determination result) to the readout unit 215 that is the request source. Note that the error detecting code may be replaced with the error correcting code as described above.

Next, it is confirmed that no error is detected in the fifth determination result obtained in step S609 (step S610). More specifically, the readout unit 215 confirms that the fifth determination result obtained from the first determining unit 122 shows that no error is detected. When the error correcting code is used instead of the error detecting code generated by the first generating unit 121, the readout unit 215 confirms that the fifth determination result shows that the error correction process is possible. Moreover, the process of sending data to the first determining unit 122 by the readout unit 215 so as to obtain the fifth determination result (step S609) and the process of confirming the fifth determination result by the readout unit 215 (step S610) may be omitted.

Next, a predetermined response is performed according to a magic number 32a in the special data 32 obtained as a result of the bit string recovery manipulation in step S608 (step S611). More specifically, the readout unit 215 assumes the bit string of data associated with the location of the first data out of the data resulting from the bit string recovery manipulation obtained in step S608 to be the magic number 32a to identify the special data identification information. Subsequently, the readout unit 215 sends a predetermined acknowledge as a readout acknowledge according to the identified special data identification information to the host interface 230. Upon receiving the readout acknowledge from the readout unit 215, the host interface 230 sends the predetermined acknowledge as the readout acknowledge to the host device, and then ends the readout process.

With the configuration and operations as described above, the second error detecting code is given to the special data and the first error detecting code in the second embodiment. Thus, it is possible to prevent the possibility that an incorrect response is returned to the host device in a case where, as a result of an error occurred in the bit string of data stored in the storage unit 160 as special data 32, the bit string resulting from the bit string manipulation in which the error is occurred becomes identical to the bit string resulting from the bit string recovery manipulation performed by the bit string recovering unit 112 by accident, or the bit string in which the error is occurred becomes in a correctable range, or in a case where, as a result of an error occurred in a bit string of data stored in the storage unit 160 as normal user data, the bit string of data in which the error is occurred becomes identical to the bit string resulting from the bit string manipulation performed by the bit string manipulating unit 111 by accident, or the bit string in which the error is occurred is subjected to the bit string recovery manipulation performed by the bit string recovering unit 112 and the error of the bit string resulting from the bit string recovery manipulation becomes in a correctable range, although the incorrect response need not necessarily be regarded as an erroneous operation. Since the other components, operations and effects are similar to those in the first embodiment, detailed description thereof is not repeated here.

The operations in the embodiment described above may be implemented by software or hardware. When the operations are implemented by software, the controller, the data storage device and the program are implemented by reading out and executing a predetermined program by an information processing device such as a CPU, for example. The predetermined program may be recorded on a recording medium such as a CD-ROM, a DVD-ROM or a flash memory, or may be recorded on a storage device connected to a network. The information processing device reads out or downloads and executes the predetermined program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirits of the inventions.

What is claimed is:

1. A controller connected to an access unit, a host interface, and a first generating unit, the access unit configured to support a readout/writing process from/to a storage unit that has a plurality of storage areas each including a user data storage area and a redundant area and stores data associated with each logical block address in each of the storage areas, the host interface configured to receive, from a host device, a special data setting request containing logical block address information and special data identification information identifying a type of a predetermined response, and send the special data setting request to a special data setting unit, the first generating unit configured to receive, from a request source, data from which a first error detecting code or a first error correcting code is to be generated, generate the first error detecting code or the first error correcting code from the data based on a predetermined method, and send the first error detecting code or the first error correcting code to the request source, the controller comprising:

a bit string manipulating unit configured to receive a manipulation target data from a request source, manipulate a bit string of the manipulation target data based on a predetermined rule, and send a manipulated manipulation target to the request source; and the special data setting unit configured to receive the special data setting request from the host interface, extract the special data identification information from the special data setting request, generate an identification bit string based on the special data identification information, send the identification bit string to the first generating unit, receive a first error detecting code associated with the identification bit string from the first generating unit, send the identification bit string and the first error detecting code as the manipulation target data to the bit string manipulating unit, receive a manipulated manipulation target data from the bit string manipulating unit, extract logical block address information from the special data setting request, and instruct the access unit to write the identification bit string in the manipulated manipulation target data to the user data storage area in the storage area located by the logical block address information and to write the first error detecting code in the manipulated manipulation target data to the redundant area.

2. The controller according to claim 1, wherein the controller is further connected to a first determining unit configured to receive, from a request source, first error detection target data or first error correction target data and the first error detecting code for the first error detection target data or the first error correcting code for the first error correction target data, determine whether or not an error is present in the first error detection target data and the first error detecting code or whether or not an error correction process of the first error correction target data and the first error correcting code is possible based on a predetermined method, and send a determination result to the request source, the host interface is further configured to receive a readout request containing logical block address information from a host device and send the readout request to a readout unit, the controller further comprises:

a bit string recovering unit configured to receive recovery manipulation target data from a request source, perform recovery manipulation of a bit string of the recovery manipulation target data, and send a recovered recovery manipulation target data to the request source; and the readout unit configured to receive the readout request from the host interface, extract the logical block address information from the readout request, instruct the access unit to readout data stored in the storage area located by a logical block address indicated by the logical block address information, receive the readout data from the access unit, send, to the first determining unit, data that were stored in the user data storage area as the first error detection target data or the first error correction target data and data that were stored in the redundant area as the first error detecting code or the first error correcting code among the readout data, receive first determination result from the first determining unit, send the data that were stored in the user data storage area among the first error detection target data as a readout acknowledge to the host interface when the obtained first determination result shows that no error is detected, correct an error in the readout data and send the data that were stored in the user data storage area among the error corrected data as a readout acknowledge to the host interface when the first determination result shows that an error correction process is possible, and when the first determination result shows that an error is detected or an error correction process is not possible, send the readout data to the bit string recovering unit, receive a recovered data from the bit string recovering unit, assume at least part of the data that were stored in the user data storage area among the recovered data to be a magic number to identify the special data identification information, and send, to the host interface, a predetermined acknowledge as a readout acknowledge according to the identified special data identification information, the host interface is further configured to receive the readout data or readout state information indicating a readout state from the readout unit, and send the received readout data or readout state information as a readout acknowledge to the host device.

3. The controller according to claim 2, wherein
the host interface is further configured to receive, from the host device, a write request containing logical block address information and data to be written and send the write request to a writing unit, and the controller further comprises the writing unit configured to receive the write request from the host interface, extract the data to be written from the write request, send the data to be written to the first generating unit, receive a first error detecting code for the data to be written from the first generating unit, extract the logical block address information from the write request, and instruct the access unit to write the data to be written to the user data storage area and write the first error detecting code to the redundant area in the storage area located by the extracted logical block address information.

4. The controller according to claim 1, wherein
the redundant area includes a first redundant area and a second redundant area, the controller is further connected to a second generating unit, the second generating unit being configured to receive, from a request source, data from which a second error detecting code or a second error correcting code is to be generated, generate the second error detecting code or the second error correcting code from the data based on a predetermined method, and send the second error detecting code or second error correcting code to the request source, the redundant area, to which the special data setting unit instructs the access unit to write a manipulated first error detecting code, is the first redundant area, and the special data setting unit is further configured to send a manipulated magic number and the manipulated first error detecting code to the second generating unit, receive a second error detecting code for the manipulated magic number and the manipulated first error detecting code, and instruct the access unit to further write the second error detecting code to the second redundant area in the storage area located by the extracted logical block address information.

5. The controller according to claim 4, wherein
the controller is further connected to a first determining unit and a second determining unit, the first determining unit configured to receive, from a request source, first error detection target data or first error correction target data and the first error detecting code for the first error detection target data or the first error correcting code for the first error correction target data, determine whether or not an error is present in the first error detection target data and the first error detecting code or whether or not an error correction process of the first error correction target data and the first error correcting code is possible based on a predetermined method, and send a determination result to the request source, the second determining unit configured to receive, from a request source, second error detection target data or second error correction target data and the second error detecting code for the second error detection target data or the second error correcting code for the second error correction target data, determine whether or not an error is present in the second error detection target data and the second error detecting code or whether or not an error correction process of the second error correction target data and the second error correcting code is possible based on a predetermined method, and send a determination result to the request source, the host interface is further configured to receive a readout request containing logical block address information from a host device and send the readout request to a readout unit, the controller further comprises:
a bit string recovering unit configured to receive recovery manipulation target data from a request source, perform recovery manipulation of a bit string of the recovery manipulation target data, and send a recovered recovery manipulation target data to the request source; and the readout unit configured to receive the readout request from the host interface, extract the logical block address information from the readout request, instruct the access unit to readout data stored in the storage area located by a logical block address indicated by the extracted logical block address information, receive the readout data from the access unit, send, to the second determining unit, data that were stored in the user data storage area and data that were stored in the first redundant area as the second error detection target data or the second error correction target data and data that were stored in the second redundant area as the second error detecting code or the second error correcting code among the readout data, receive a second determination result from the second determining unit, send, to the first determining unit, the data that were stored in the user data storage area as the first error detection target data and the data that were stored in the first redundant area as the first error detecting code among the readout data and receive a first determination result from the first determining unit when the second determination result shows that no error is detected, correct an error in the second error correction target data to generate error corrected data and send, to the first determining unit, the data that were stored in the user data storage area as the first error correction target data and the data that were stored in the first redundant area as the first error detecting code among the error corrected data and receive a first determination result from the first determining unit when the second determination result shows that an error correction process is possible, send the data that were stored in the user data storage area among the first error detection target data as a readout acknowledge to the host interface when the obtained first determination result shows that no error is detected or an error correction process is possible, and when the first determination result shows that an error is detected or an error correction process is not possible, send, to the bit string recovering unit, the data that were stored in the user data storage area and the data that were stored in the first redundant area among the first error detection target data as the recovery manipulation target data, receive a recovered data from the bit string recovering unit, assume at least part of the data that were stored in the user data storage area among the recovered data to be the magic number to identify the special data identification information, and send a predetermined acknowledge as a readout acknowledge according to the identified special data identification information to the host interface, the host interface is further configured to receive the readout data or readout state information indicating a readout state from the readout unit, and send the received readout data or readout state information as a readout acknowledge to the host device.

6. The controller according to claim 5, wherein the host interface is further configured to receive a write request containing logical block address information and data to be written from the host device and send the write request to a writing unit, and the controller further comprises the writing unit configured to receive the write request from the host interface, extract the data to be written from the write request, send the data to be written to the first generating unit, receive a first error detecting code for the data to be written from the first generating unit, send the data to be written and the first error detecting code to the second generating unit, receive a second error detecting code for the data to be written and the first error detecting code, extract the logical block address information from the write request, and instruct the access unit to write the data to be written to the user data storage area, to write the first error detecting code to the first redundant area and to write the second error detecting code to the second redundant area in the storage area located by the extracted logical block address information.

7. A data storage device comprising:

a storage unit having a plurality of storage areas each including a user data storage area and a redundant area and storing data associated with each logical block address in each or the storage areas;

an access unit configured to support a readout/writing process from/to the storage unit;

a host interface configured to receive, from a host device, a special data setting request containing logical block address information and special data identification information for identifying a type of a predetermined response, a readout request containing logical block address information and a write request containing logical block address information and data to be written, and send the special data setting request to a special data setting unit, the readout request to a readout unit and the write request to a writing unit;

a generating unit configured to receive, from a request source, data from which an error detecting code or an error correcting code is to be generated, generate the error detecting code or the error correcting code from the data based on a predetermined method, and send the error detecting code or the error correcting code to the request source;

a determining unit configured to receive, from a request source, error detection target data or error correction target data and the error detecting code for the error detection target data or the error correcting code for the error correction target data, determine whether or not an error is present in the error detection target data and the error detecting code or whether or not an error correction process of the error correction target data and the error correcting code is possible based on a predetermined method, and send a determination result to the request source;

a bit string manipulating unit configured to receive manipulation target data from a request source, manipulates a bit string of the manipulation target data based on a predetermined rule, and send a manipulated manipulation target data to the request source;

a bit string recovering unit configured to receive recovery manipulation target data from a request source, perform recovery manipulation of a bit string of the recovery manipulation target data, and send a recovered recovery manipulation target data to the request source;

the special data setting unit configured to receive the special data setting request from the host interface, extract the special data identification information from the special data setting request, generate a magic number based on the special data identification information, send the magic number to the generating unit, receive an error detecting code for the magic number from the generating unit, send the magic number and the error detecting code as the manipulation target data to the bit string manipulating unit, receive the manipulated manipulation target data from the bit string manipulating unit, extract logical block address information from the special data setting request, and instruct the access unit to write the magic number in the manipulated manipulation target data to the user data storage area and to write the error detecting code in the manipulated manipulation target data to the redundant area in the storage area located by the extracted logical block address information;

the readout unit configured to receive the readout request from the host interface, extract the logical block address information from the readout request, instruct the access unit to readout data stored in the storage area located by a logical block address indicated by the extracted logical block address information, receive the readout data from the access unit, send, to the determining unit, data that were stored in the user data storage area as the error detection target data or the error correction target data and data that were stored in the redundant area as the error detecting code or the error correcting code among the readout data, receive a determination result from the determining unit, send the data that were stored in the user data storage area among the readout data as a readout acknowledge to the host interface when the determination result shows that no error is detected, correct an error in the readout data and send the data that were stored in the user data storage area out of the error corrected data as a readout acknowledge to the host interface when the determination result shows that an error correction process is possible, and when the determination result shows that an error is detected or an error correction process is not possible, send the readout data to the bit string recovering unit, receive the recovered data from the bit string recovered unit, assume at least part of the data that were stored in the user data storage area among the recovered data to be the magic number to identify the special data identification information, and send a predetermined acknowledge as a readout acknowledge according to the identified special data identification information; and the writing unit configured to receive the write request from the host interface, extract the data to be written from the write request, send the data to be written to the generating unit, receive an error detecting code for the data to be written, extract the logical block address information from the write request, and instruct the access unit to write the data to be written to the user data storage area and write the error detecting code to the redundant area in the storage area located by the logical block address information, wherein the host interface is further configured to receive the readout data or readout state information indicating a readout state from the readout unit, and send the readout data or the readout state information as a readout acknowledge to the host device.

8. The data storage device according to claim 7, wherein the redundant area includes a first redundant area and a second redundant area, the data storage device further comprises a second generating unit, the second generating unit being configured to receive, from a request source, data from which a second error detecting code or a second error correcting code is to be generated, generate the second error detecting code or the second error correcting code from the data based on a predetermined method, and send the second error detecting code or second error correcting code to the request source, the redundant area, to which the special data setting unit instructs the access unit to write a manipulated first error detecting code, is the first redundant area, and the special data setting unit is further configured to send a manipulated magic number and a manipulated first error detecting code to the second generating unit, receive a second error detecting code for the manipulated magic number and the manipulated first error detecting code, and instruct the access unit to further write the second error detecting code to the second redundant area in the storage area located by the extracted logical block address information.

9. The data storage device according to claim 8, further comprising:

a first determining unit configured to receive, from a request source, first error detection target data or first error correction target data and the first error detecting code for the first error detection target data or the first error correcting code for the first error correction target data, determine whether or not an error is present in the first error detection target data and the first error detecting code or whether or not an error correction process of the first error correction target data and the first error correcting code is possible based on a predetermined method, and send a determination result to the request source; and a second determining unit configured to receive, from a request source, second error detection target data or second error correction target data and the second error detecting code for the second error detection target data or the second error correcting code for the second error correction target data, determine whether or not an error is present in the second error detection target data and the second error detecting code or whether or not an error correction process of the second error correction target data and the second error correcting code is possible based on a predetermined method, and send a determination result to the request source, wherein the readout unit is configured to receive the readout request from the host interface, extract the logical block address information from the readout request, instruct the access unit to readout data stored in the storage area located by a logical block address indicated by the extracted logical block address information, receive the readout data from the access unit, send, to the second determining unit, data that were stored in the user data storage area and data that were stored in the first redundant area as the second error detection target data or the second error correction target data and data that were stored in the second redundant area as the second error detecting code or the second error correcting code among the readout data, receive a second determination result from the second determining unit, send, to the first determining unit, the data that were stored in the user data storage area as the first error detection target data and the data that were stored in the first redundant area as the first error detecting code among the readout data and receive a first determination result from the first determining unit when the second determination result shows that no error is detected, correct an error in the second error correction target data to generate error corrected data and send, to the first determining unit, the data that were stored in the user data storage area as the first error correction target data and the data that were stored in the first redundant area as the first error detecting code among the error corrected data and receive a first determination result from the first determining unit when the second determination result shows that an error correction process is possible, send the data that were stored in the user data storage area among the first error detection target data as a readout acknowledge to the host interface when the obtained first determination result shows that no error is detected or an error correction process is possible, and when the first determination result shows that an error is detected or an error correction process is not possible, send, to the bit string recovering unit, the data that were stored in the user data storage area and the data that were stored in the first redundant area among the first error detection target data as the recovery manipulation target data, and receive a recovered data from the bit string recovering unit.

10. The data storage device according to claim 9, wherein the writing unit is configured to receive the write request from the host interface, extract the data to be written from the write request, send the data to be written to the first generating unit, receive a first error detecting code for the data to be written from the first generating unit, send the data to be written and the first error detecting code to the second generating unit, receive a second error detecting code for the data to be written and the first error detecting code, extract the logical block address information from the write request, and instruct the access unit to write the data to be written to the user data storage area, to write the first error detecting code to the first redundant area and to write the second error detecting code to the second redundant area in the storage area located by the extracted logical block address information.

11. A program product having a non-transitory computer readable medium including programmed instructions, which are executed by a computer that controls an access unit, a host interface, a generating unit, and a determining unit, the access unit configured to support a readout/writing process from/to a storage unit that has a plurality of storage areas each including a user data storage area and a redundant area and store data associated with each logical block address in each of the storage areas, the host interface configured to receive, from a host device, a special data setting request containing logical block address information and special data identification information for identifying a type of a predetermined response, a readout request containing logical block address information and a write request containing logical block address information and data to be written, and send the special data setting request to a computer executing a special data setting process, the readout request to a computer executing a readout process and the write request to a computer executing a writing process, the generating unit configured to receive, from a request source, data from which an error detecting code or an error correcting code is to be generated, generate the error detecting code or the error correcting code from the data based on a predetermined method, and send the error detecting code or the error correcting code to the request source, the determining unit configured to receive, from a request source, error detection target data or error correction target data and the error detecting code for the error detection target data or the error correcting code for the error correction target data, determine whether or not an error is present in the error detection target data and the error detection code or whether or not an error correction process of the error correction target data and the error correcting code is possible based on a predetermined method, and send a determination result to the request source, wherein the instructions, when executed by the computer, causes the computer to perform:

a bit string manipulation process of receiving manipulation target data from a request source, manipulating a bit string of the received manipulation target data based on a predetermined rule, and sending a manipulated manipulation target data to the request source;

a bit string recovery process of receiving recovery manipulation target data from a request source, performing recovery manipulation of a bit string of the received recovery manipulation target data, and sending a recovered recovery manipulation target data to the request source;

the special data setting process of receiving the special data setting request from the host interface, extracting the special data identification information from the special data setting request, generating a magic number based on the special data identification information, sending the magic number to the generating unit, receiving an error detecting code for the magic number from the generating unit, inputting the magic number and the error detecting code as the manipulation target data to the bit string manipulation process to obtain a manipulated manipulation target data, extracting logical block address information from the special data setting request, and instructing the access unit to write the magic number in the manipulated manipulation target data to the user data storage area and to write the error detecting code in the manipulated manipulation target data to the redundant area in the storage area located by the extracted logical block address information;

the readout process of receiving the readout request from the host interface, extracting the logical block address information from the readout request, instructing the access unit to readout data stored in the storage area located by a logical block address indicated by the extracted logical block address information, receiving the readout data from the access unit, sending, to the determining unit, data that were stored in the user data storage area as the error detection target data or the error correction target data and data that were stored in the redundant area as the error detecting code or the error correcting code among the readout data, receiving a determination result from the determining unit, sending the data that were stored in the user data storage area among the readout data as a readout acknowledge to the host interface when the obtained determination result shows that no error is detected, correcting an error in the readout data and sending the data that were stored in the user data storage area among the error corrected data as a readout acknowledge to the host interface when the determination result shows that an error correction process is possible, and when the determination result shows that an error is detected or an error correction process is not possible, inputting the readout data to the bit string recovery manipulation process to obtain a recovered data, assuming at least part of the data that were stored in the user data storage area among the recovered data to be the magic number to identify the special data identification information, and sending a predetermined acknowledge as a readout acknowledge according to the identified special data identification information; and the writing process of receiving the write request from the host interface, extracting the data to be written from the write request, sending the data to be written to the generating unit, receiving an error detecting code for the data to be written from the generating unit, extracting the logical block address information from the write request, and instructing the access unit to write the data to be written to the user data storage area and write the error detecting code to the redundant area in the storage area located by the extracted logical block address information, wherein the host interface is further configured to receive the readout data or readout state information indicating a readout state in the readout process, and send the readout data or the readout state information as a readout acknowledge to the host device.

12. The program product according to claim 11, wherein the redundant area includes a first redundant area and a second redundant area, the computer controls a second generating unit, the second generating unit being configured to receive, from a request source, data from which a second error detecting code or a second error correcting code is to be generated, generate the second error detecting code or the second error correcting code from the data based on a predetermined method, and send the second error detecting code or second error correcting code to the request source, the redundant area, to which the special data setting unit instructs the access unit to write a manipulated first error detecting code, is the first redundant area, and the special data setting process includes sending a manipulated magic number and a manipulated first error detecting code to the second generating unit, receiving a second error detecting code for the manipulated magic number and the manipulated first error detecting code, and instructing the access unit to further write the second error detecting code to the second redundant area in the storage area located by the extracted logical block address information.

13. The program product according to claim 12, wherein the computer controls:

a first determining unit configured to receive, from a request source, first error detection target data or first error correction target data and the first error detecting code for the first error detection target data or the first error correcting code for the first error correction target data, determine whether or not an error is present in the first error detection target data and the first error detecting code or whether or not an error correction process of the first error correction target data and the first error correcting code is possible based on a predetermined method, and send a determination result to the request source; and a second determining unit configured to receive, from a request source, second error detection target data or second error correction target data and the second error detecting code for the second error detection target data or the second error correcting code for the second error correction target data, determine whether or not an error is present in the second error detection target data and the second error detecting code or whether or not an error correction process of the second error correction target data and the second error correcting code is possible based on a predetermined method, and send a determination result to the request source, and the readout process includes receiving the readout request from the host interface, extracting the logical block address information from the readout request, instructing the access unit to readout data stored in the storage area located by a logical block address indicated by the extracted logical block address information, receiving the readout data from the access unit, sending, to the second determining unit, data that were stored in the user data storage area and data that were stored in the first redundant area as the second error detection target data or the second error correction target data and data that were stored in the second redundant area as the second error detecting code or the second error correcting code among the readout data, receiving a second determination result from the second determining unit, sending, to the first determining unit, the data that were stored in the user data storage area as the first error detection target data and the data that were stored in the first redundant area as the first error detecting code among the readout data and receiving a first determination result from the first determining unit when the second determination result shows that no error is detected, correcting an error in the second error correction target data to generate error corrected data and sending, to the first determining unit, the data that were stored in the user data storage area as the first error correction target data and the data that were stored in the first redundant area as the first error detecting code among the error corrected data and receiving a first determination result from the first determining unit when the second determination result shows that an error correction process is possible, sending the data that were stored in the user data storage area among the first error detection target data as a readout acknowledge to the host interface when the obtained first determination result shows that no error is detected or an error correction process is possible, and when the first determination result shows that an error is detected or an error correction process is not possible, sending, to the bit string recovering unit, the data that were stored in the user data storage area and the data that were stored in the first redundant area among the first error detection target data as the recovery manipulation target data, and receiving a recovered data from the bit string recovering unit.

14. The program product according to claim 13, wherein the writing process includes receiving the write request from the host interface, extracting the data to be written from the write request, sending the data to be written to the first generating unit, receiving a first error detecting code for the data to be written from the first generating unit, sending the data to be written and the first error detecting code to the second generating unit, receiving a second error detecting code for the data to be written and the first error detecting code, extracting the logical block address information from the write request, and instructing the access unit to write the data to be written to the user data storage area, to write the first error detecting code to the first redundant area and to write the second error detecting code to the second redundant area in the storage area located by the extracted logical block address information.

* * * * *